United States Patent [19]
Okada et al.

[11] Patent Number: 6,122,436
[45] Date of Patent: Sep. 19, 2000

[54] OPTICAL DISC, OPTICAL DISC RECORDING METHOD AND APPARATUS, AND OPTICAL DISC REPRODUCING METHOD AND APPARATUS

[75] Inventors: Tomoyuki Okada, Katano; Kaoru Murase, Nara; Kazuhiro Tsuga, Takarazuka, all of Japan

[73] Assignee: Matsushita Electric Industrial Co., Ltd., Osaka, Japan

[21] Appl. No.: 09/287,336

[22] Filed: Apr. 7, 1999

[30] Foreign Application Priority Data

Apr. 8, 1998 [JP] Japan .................................. 10-095661

[51] Int. Cl.$^7$ .............................. H04N 5/84; H04N 5/781
[52] U.S. Cl. ............................ 386/126; 386/104
[58] Field of Search .............................. 386/96, 126, 125, 386/109, 111, 112, 106, 107, 117, 98, 46, 1, 27, 33, 39, 105; H04N 5/84, 5/781

[56] References Cited

U.S. PATENT DOCUMENTS

| | | |
|---|---|---|
| 5,481,543 | 1/1996 | Veltman . |
| 5,559,999 | 9/1996 | Maturi et al. ........................... 395/550 |
| 5,614,946 | 3/1997 | Fukuoka . |
| 5,715,176 | 2/1998 | Mobini ..................................... 386/75 |
| 5,815,634 | 9/1998 | Daum et al. .............................. 386/96 |

FOREIGN PATENT DOCUMENTS 0 755 162   1/1997   European Pat. Off. .

*Primary Examiner*—Robert Chevalier
*Attorney, Agent, or Firm*—Wenderoth, Lind & Ponack, L.L.P.

[57] ABSTRACT

An optical disc that is reproducible by a reproducing apparatus has a still picture data and an audio data which are reproduced simultaneously. The still picture data is stored in a video part stream (ST1) comprising a plurality of units, and the audio data is stored in a second system stream (ST2) comprising one or a plurality of units. The units store time stamp information so that the second system stream (ST2) follows immediately after the video part stream (ST1). By changing the data in the second system stream (ST2), the audio data presented with a still picture can be freely and easily changed even after recording the still picture data using an MPEG standard format.

21 Claims, 20 Drawing Sheets

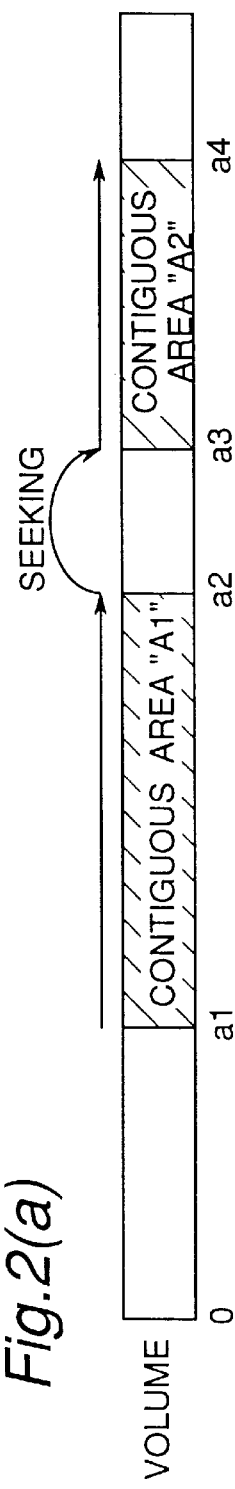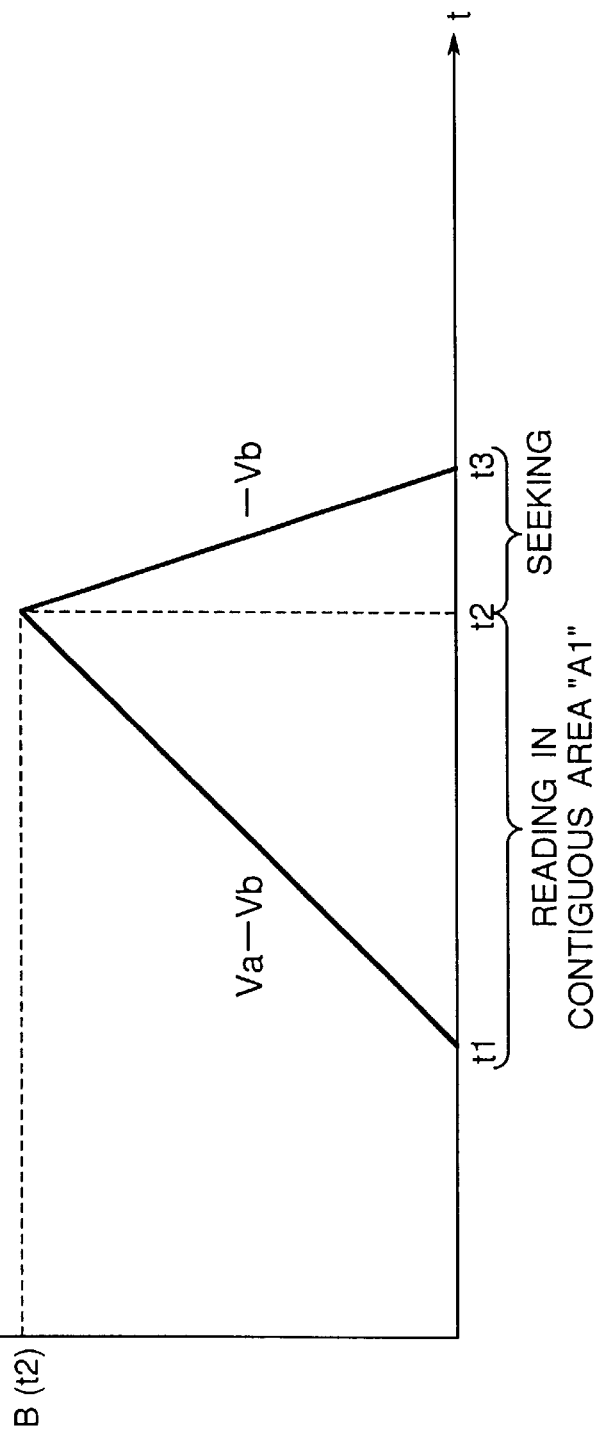
Fig.2(a)
Fig.2(b)

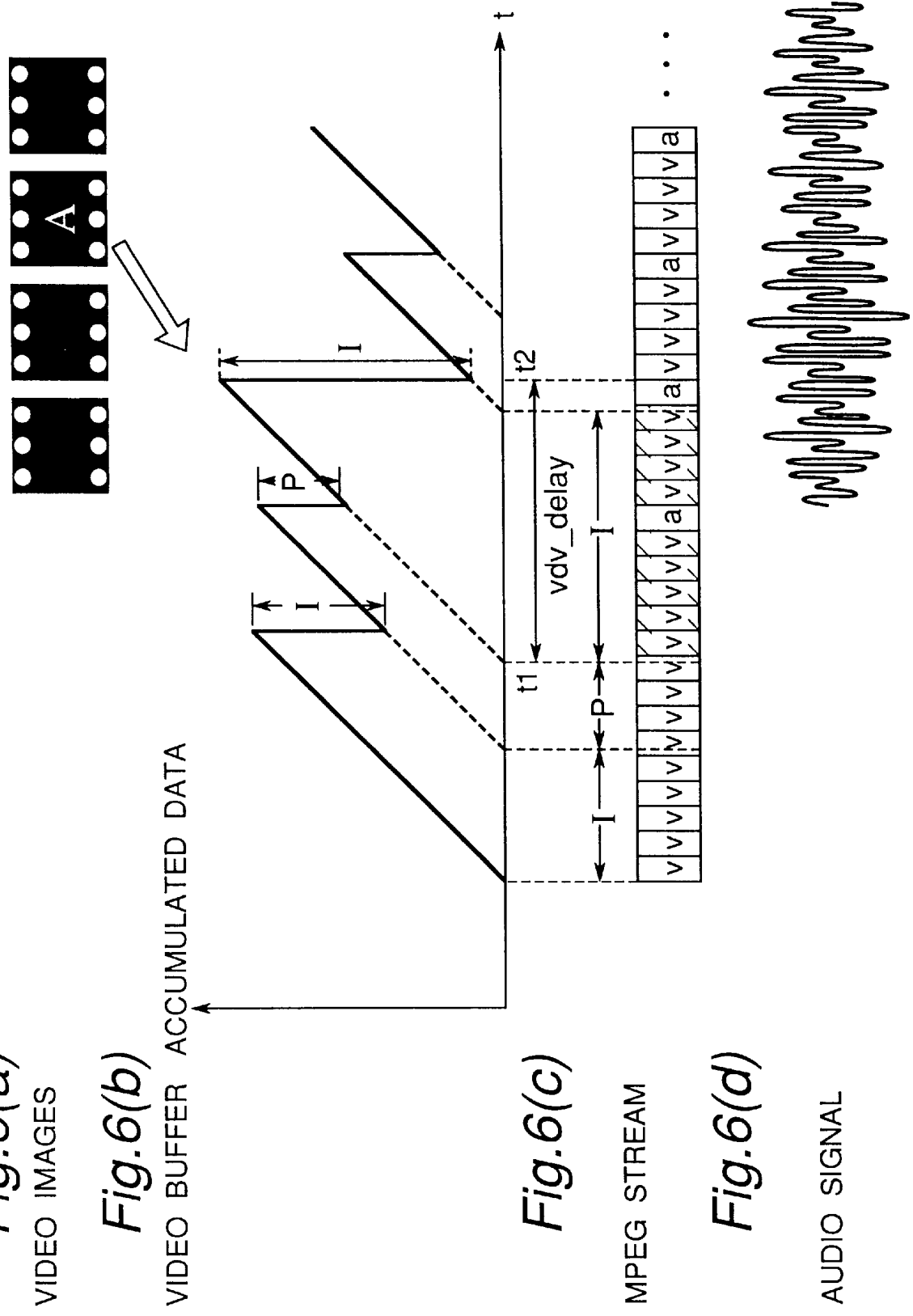
Fig.6(a) VIDEO IMAGES
Fig.6(b) VIDEO BUFFER ACCUMULATED DATA
Fig.6(c) MPEG STREAM
Fig.6(d) AUDIO SIGNAL

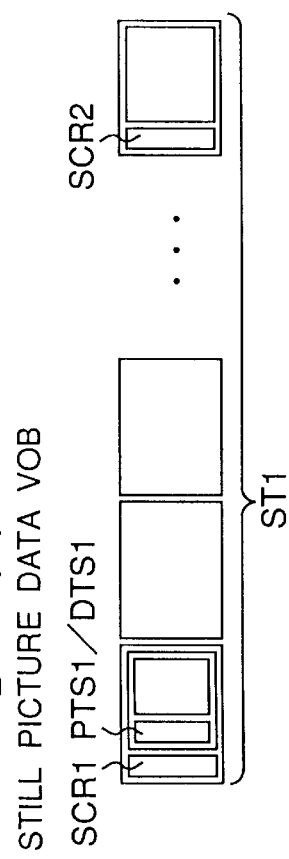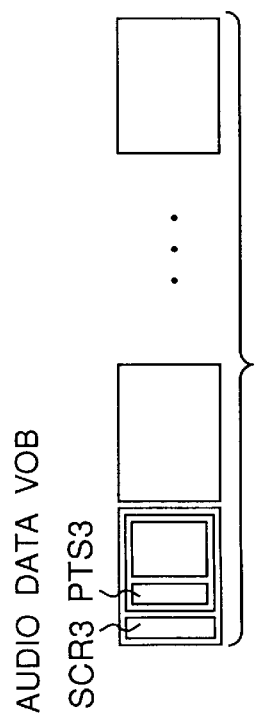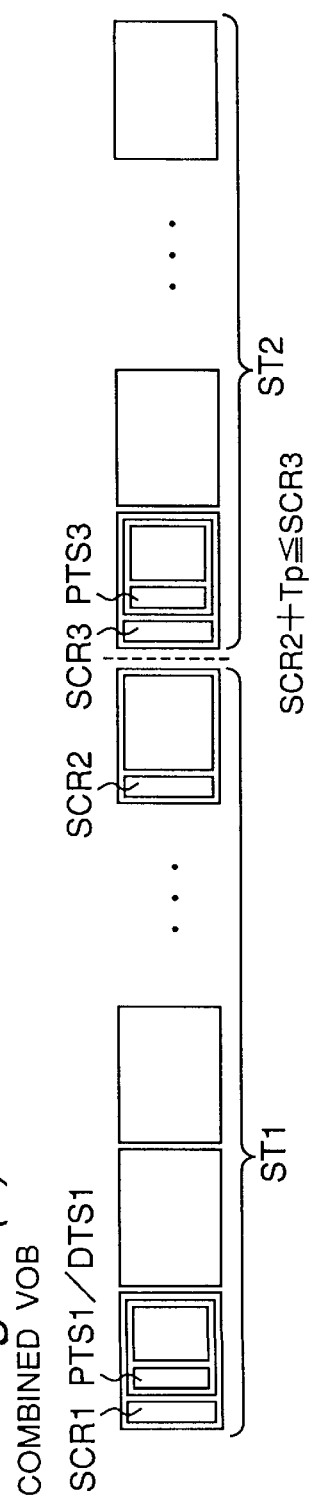

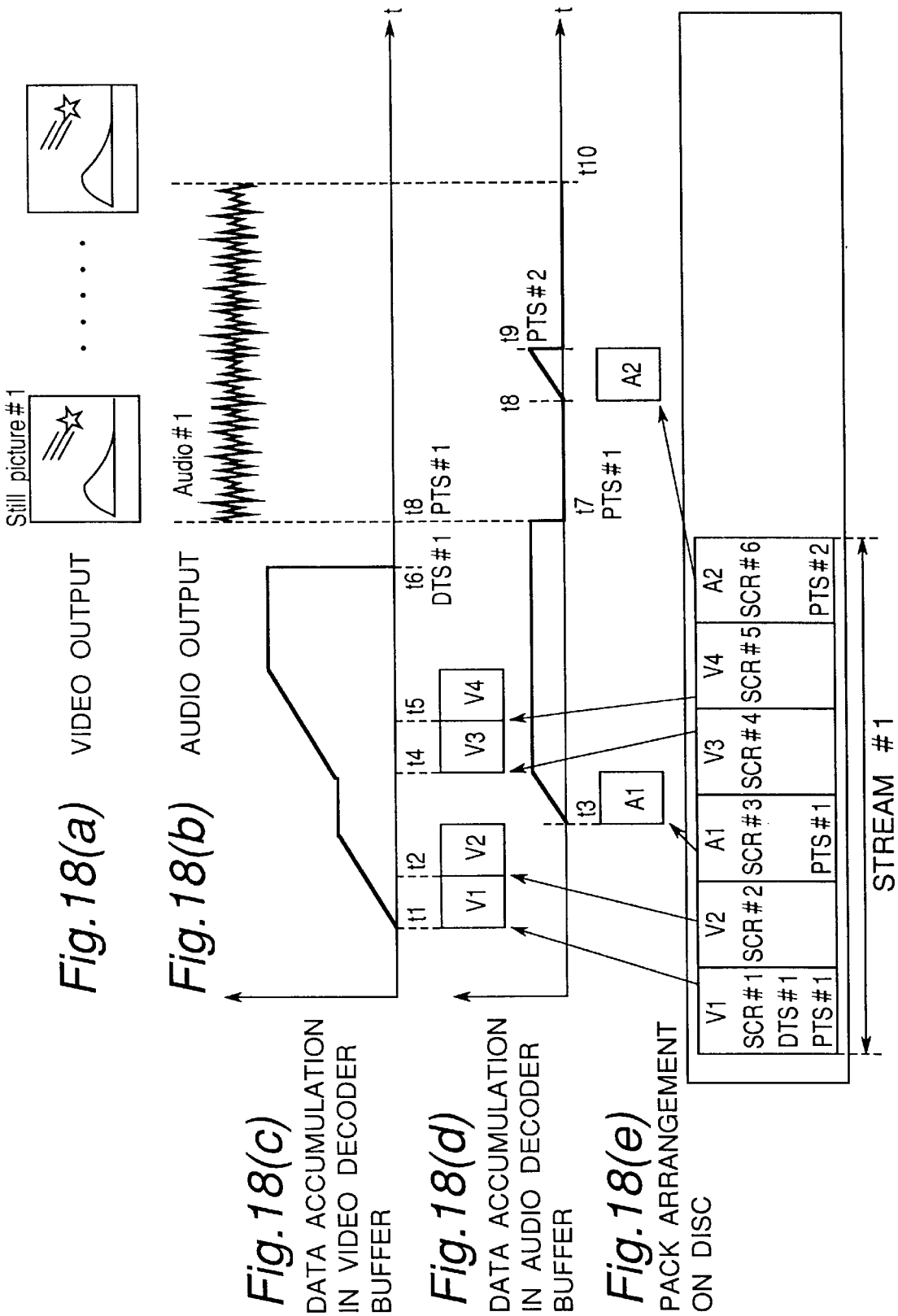

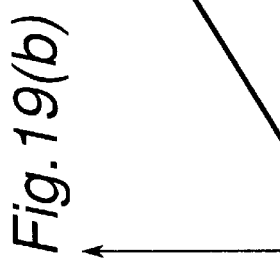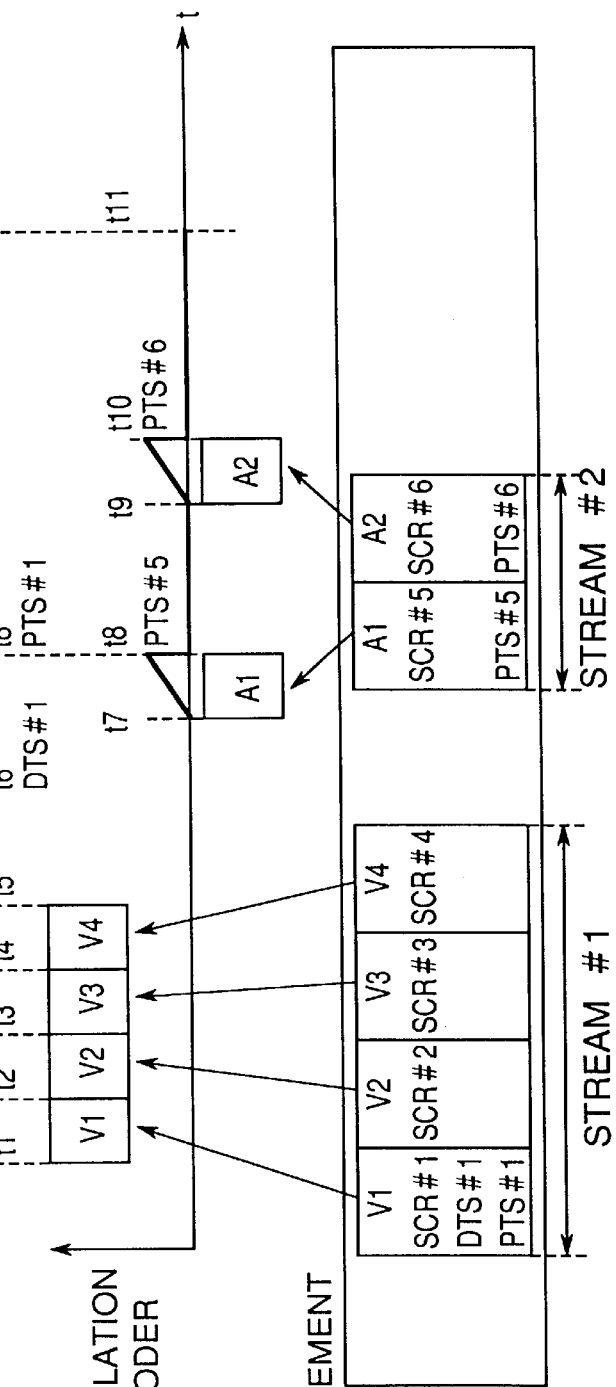
Fig.19(a) VIDEO OUTPUT
Fig.19(b) AUDIO OUTPUT
Fig.19(c) DATA ACCUMULATION IN VIDEO DECODER BUFFER
Fig.19(d) DATA ACCUMULATION IN AUDIO DECODER BUFFER
Fig.19(e) PACK ARRANGEMENT ON DISC

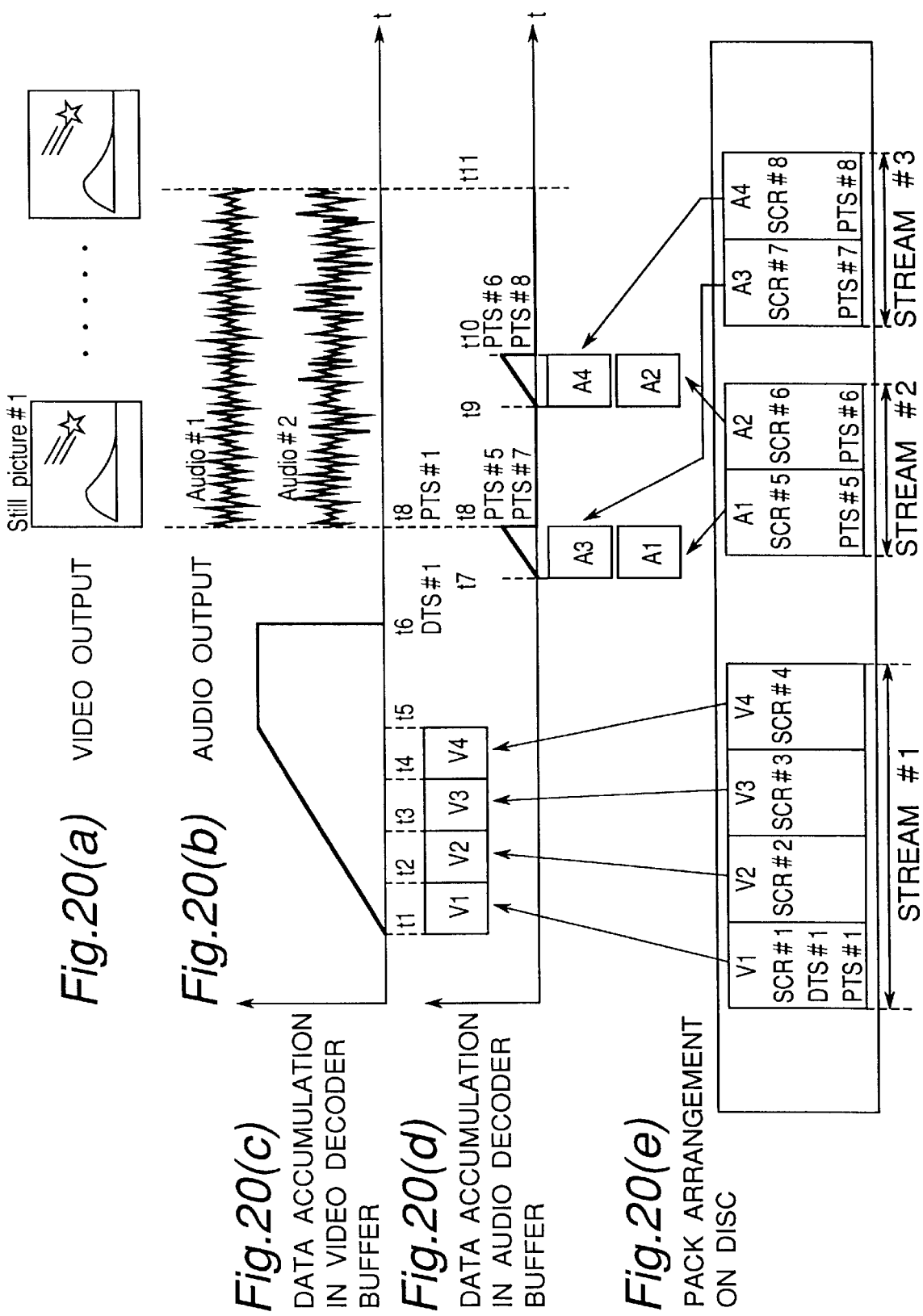

OPTICAL DISC, OPTICAL DISC RECORDING METHOD AND APPARATUS, AND OPTICAL DISC REPRODUCING METHOD AND APPARATUS

BACKGROUND OF THE INVENTION

1. Field of the Invention

The present invention relates to an optical disc for recording still picture data and audio data to be produced simultaneously with the still picture, an apparatus and a method for recording such an optical disc, and an apparatus and a method for reproducing such an optical disc.

2. Description of the Prior Art

Digital Cameras

Digital cameras for capturing still pictures using the JPEG compression format, formally known as the ISO/IEC 10918-1 standard, have become widely available in the last few years. One reason for the growing popularity of digital cameras is the improved audio-visual (AV) processing capability of modern personal computers (PC).

Images captured by a digital camera can be transferred by various means, including semiconductor memory, floppy disk, and infrared communications, to a PC in a format enabling the image data to be processed and manipulated on the PC. The captured image data can then be edited on the PC for use by presentation programs, word processors, and by Internet content providers.

Digital cameras enabling audio to be captured with still pictures have been more recently introduced. This ability to capture sound with still pictures has helped to further differentiate the digital camera from conventional film-based still cameras.

FIG. 7 shows the relationship between still picture data (JPEG data) and audio data recorded by such a digital camera. As shown in FIG. 7, the still picture data (JPEG data) and audio data are stored in separate files. Each time a picture is taken (recorded), separate JPEG data and audio data files are created.

There are two basic methods for managing the relationship between still picture data (JPEG data) and audio data files. The first, as shown in FIG. 7(a), uses a link manager to maintain the relationship (link) between a JPEG data file and the associated audio data file. The other, as shown in FIG. 7(b), assigns the same root file name (the part of the file name minus the extension, e.g., "xyz" in FIG. 7(b)) to both the JPEG data file and the audio data file.

Using either of the above-described methods, an audio data file can be linked to a particular still picture data file when the picture is captured, and can be changed during any later editing process. That is, if the user decides after taking a picture that the audio associated with that picture is inappropriate or undesirable, different audio data can be selected and linked to the image data on the PC.

The advent of MPEG (Moving Picture Experts Group) standards for handling audio-video data containing moving and still pictures together with audio has also accelerated the development of multimedia products and services based on MPEG standards.

When image data and audio are recorded using the MPEG standard, the audio stream and video stream are multiplexed and recorded as a single system stream as shown in FIG. 6(c). This makes it very difficult to freely change the audio stream associated with a particular video stream after the initial recording. More specifically, to change the audio data recorded for a particular still picture, the still picture data and audio data must be edited together as a single MPEG system stream. This means that the MPEG system stream must first be decoded, and the extracted still picture data and audio data must then be re-encoded as a single system stream after editing. Editing the still picture data and audio data after recording is therefore much more difficult than it is with a conventional digital camera.

SUMMARY OF THE INVENTION

An object of the present invention is therefore to provide a recording medium, an apparatus, and a method whereby audio data presented with a still picture can be freely and easily changed even after recording the still picture data using an MPEG standard format.

To achieve the above object, a recording medium according to the present invention that is reproducible by a reproducing apparatus having a decoder buffer, decoder, and output section, has recorded thereto a video part stream, such as a first system stream, (ST1) comprising a plurality of units containing still picture data for at least one picture, and an audio part stream, such as a second system stream, (ST2) comprising one or a plurality of units containing audio data to be reproduced with the still picture data. The units of these system streams store time stamp information indicative of a time required for a decoding process and output. This time stamp information includes a time SCR2 at which the last unit in the first system stream is input to a decoder buffer, and a time SCR3 at which the first unit in the second system stream is input to a decoder buffer. These times SCR2 and SCR3 are defined to satisfy the equation $$SCR2 + Tp \leq SCR3$$

where Tp is the time required to completely one unit to a decoder buffer.

By the above arrangement, the second system stream carrying the audio data is stored in the optical disc independently of the first system stream. Thus, the data in the second system stream can be easily revised.

Preferably, the time stamp information further includes a time SCR1 at which the first unit in the first system stream is input to a decoder buffer. In this case, times SCR1 and SCR2 are defined as:

$$SCR1 = 0$$

$$SCR2 + Tp \leq 27000000 \text{ (27 MHz)}$$

where (27 MHz) indicates that the numeric value shown therebefore is a count of a 27 MHz clock.

By this arrangement, the time period for transferring the first system stream completely to the decoder buffer can be set to 1 second or less.

Yet further preferably in this case, time SCR3 is defined as SCR3 = 27000000 (27 MHz).

By this arrangement, the transfer start time of the second system stream to the decoder buffer can be set to 1 second after the start transfer time of the first system stream to the decoder buffer.

Yet further preferably, the time stamp information also includes a time PTS1 at which the first system stream is presented from the output section, and a time PTS3 at which the second system stream is output from the decoder. In this case, times PTS1 and PTS3 are the same.

By this arrangement, the still picture produced by the first system stream and the sound produced by the second system stream can be effected simultaneously.

Yet further preferably, the time stamp information also includes a decoding start time DTS1 at which a decoder starts decoding the first system stream. This time DTS1 is defined as:

DTS1=90000 (90 kHz)

where (90 kHz) indicates that the numeric value shown therebefore is a count of a 90 kHz clock.

By this arrangement, the decode start time of the second system stream can be set to 1 second after the start transfer of the first system stream to the decoder buffer.

In this case, times PTS1 and PTS3 are preferably defined by the equation:

PTS1=PTS3=90000(90 kHz)+Tv where (90 kHz) indicates that the numeric value shown therebefore is a count of a 90 kHz clock, and Tv is the video data frame period.

By this arrangement, the presentation of the still picture and the sound can be done after 1 second plus 1 frame period Tv from the start transfer of the first system stream to the decoder buffer.

First and second system stream management information (Volume information) is further preferably recorded to an optical disc according to the present invention, and the management information for the first system stream includes an identification flag (Audio_Flag) for declaring there is audio data to be reproduced synchronized with the still picture data.

By this identification flag, it is possible to detect whether or not the sound accompanies the still picture.

An optical disc recording apparatus for recording a system stream containing still picture data and audio data to be reproduced with the still picture data to an optical disc according to the present invention comprises an encoder and a system controller. The encoder generates a first system stream (ST1) comprising a plurality of units containing still picture data for at least one picture, and a second system stream (ST2) comprising one or a plurality of units containing audio data to be reproduced with the still picture data. The system controller stores in said units time stamp information indicative of a time required for a decoding process and output. The time stamp information includes a time SCR2 at which the last unit in the first system stream is input to a decoder buffer, and a time SCR3 indicative of a time at which the first unit in the second system stream is input to a decoder buffer. These times SCR2 and SCR3 are defined to satisfy the equation:

SCR2+Tp≦SCR3 where Tp is the time required from the start to the end of inputting one unit to a decoder buffer.

By the above arrangement, the second system stream carrying the audio data is stored in the optical disc independently of the first system stream. Thus, the data in the second system stream can be easily revised.

The system controller of this optical disc recording apparatus further preferably stores as time stamp information a time SCR1 at which the first unit in the first system stream is input to a decoder buffer, and a time PTS1 at which the first system stream is output from the output section. These times SCR1, SCR2, and PTS1 are defined as:

SCR1=0

SCR2≦27000000 (27 MHz)−Tp

PTS1=90000 (90 kHz)+Tv where (27 MHz) indicates that the numeric value shown therebefore is a count of a 27 MHz clock, (90 kHz) indicates that the numeric value shown therebefore is a count of a 90 kHz clock, Tp is the time required to transfer the last unit of the first system stream, and Tv is the video data frame period.

By this arrangement, the time for start transferring the first system stream to the decoder buffer is set to 0, the time for finish transferring the first system stream to the decoder buffer is set to 1 second or less, and the time for displaying or presenting the still picture is set to 1 second plus 1 frame period Tv from the start transfer of the first system stream to the decoder buffer.

Further preferably, the system controller further stores as time stamp information a time PTS3 at which the second system stream is output from the decoder. In this case, times SCR3 and PTS3 are defined as:

SCR3=27000000 (27 MHz)

PTS3=90000 (90 kHz)+Tv.

By this arrangement, the time for transferring the second system stream to the decoder buffer can be set to 1 second from the strart transfer of the first system stream, and the time for decoding and reproducing the sound can be set to 1 second plus 1 frame period Tv.

The system controller further preferably generates first and second system stream management information, and stores in the management information for the first system stream an identification flag (Audio_Flag). This flag is used for declaring whether there is audio data to be reproduced synchronized with the still picture data.

By this identification flag, it is possible to detect whether or not the sound accompanies the still picture.

The system controller yet further preferably records audio data reproduction time (Cell_Playback_Time) in the management information for the second system stream.

By this arrangement, it is possible to set the sound reproducing time.

An optical disc reproducing apparatus for reproducing an optical disc according to the present invention comprises a decoder buffer, a decoder, an output section, and a system controller. When the system controller detects that the identification flag (Audio_Flag) is set, it synchronously reproduces still picture data in the first system stream and audio data in the second system stream.

By this arrangement, it is possible to previously detect whether or not the sound accompanying the still picture exists.

Preferably, when the system controller detects that the identification flag (Audio_Flag) is set, a decoder completely decodes one picture of still picture data recorded to the first system stream and sends the decoded data to the output section, and another decoder then decodes while reproducing audio data stored to the second system stream. As a result, presentation of still picture data from the output section begins with the start of audio presentation.

By this arrangement, it is possible to decode the still picture data in the first system stream and the audio data in the second system stream in separate time periods.

The present invention also provides an optical disc recording method for recording a system stream containing still picture data and a separate system stream containing audio data to be reproduced with the still picture data to an optical disc according to the present invention.

In addition, the present invention also provides an optical disc reproduction method for reproducing an MPEG stream recorded to an optical disc according to the present invention.

BRIEF DESCRIPTION OF THE DRAWINGS

The present invention will become more fully understood from the detailed description given below and the accompanying diagrams wherein:

FIGS. 2(a) and 2(b) show the relationship between address space on a disc and the amount of data stored in the track buffer;

FIGS. 6(a), 6(b), 6(c) and 6(d) show video data, the change in the amount of data stored to the video buffer, a typical MPEG system stream, and an audio data signal, respectively, according to prior art;

FIGS. 11(a), 11(b) and 11(c) are diagrams showing a still picture data VOB, an audio data VOB, and a combined VOB, according to the present invention;

FIGS. 18(a), 18(b), 18(c), 18(d) and 18(e) are diagrams showing an operation according to the prior art to reproduce a still picture with an audio data;

FIGS. 19(a), 19(b), 19(c), 19(d) and 19(e) are diagrams showing an operation according to the present invention to reproduce a still picture with single audio data; and FIGS. 20(a), 20(b), 20(c), 20(d) and 20(e) are diagrams showing an operation according to the present invention to reproduce a still picture with dual audio data.

DESCRIPTION OF PREFERRED EMBODIMENTS

The preferred embodiments of the present invention are described below with reference to the accompanying figures.

A preferred embodiment of the present invention is described below with reference to a DVD recording apparatus using DVD-RAM as the MPEG stream recording medium.

1. Overview of a Normal MPEG Stream

A normal MPEG stream of audio-video data is described first below. The structure of the MPEG stream will be known to those with ordinary knowledge of the related art, and the following description therefore focuses on those parts having a particular relationship to the present invention.

As previously noted above, the MPEG standard defines an audio-video compression method that has been formalized as the ISO/IEC 13818 international standard.

The MPEG standard achieves high efficiency data compression primarily by means of the following two features.

First, moving picture data is compressed using a combination of conventional intraframe compression using a spatial frequency characteristic to remove intraframe redundancy, and interframe compression using temporal correlations between frames to remove redundancy in adjacent frames. Even more specifically, the MPEG standard compresses moving picture data by first categorizing each frame (also referred to as a picture in MPEG parlance) as an I picture (intra-coded frame), P picture (a predictive-coded frame that is coded with reference to a preceding picture), or a B picture (a bidirectionally predictive-coded frame that is coded with reference to both a preceding and a following picture).

Figure 3A:
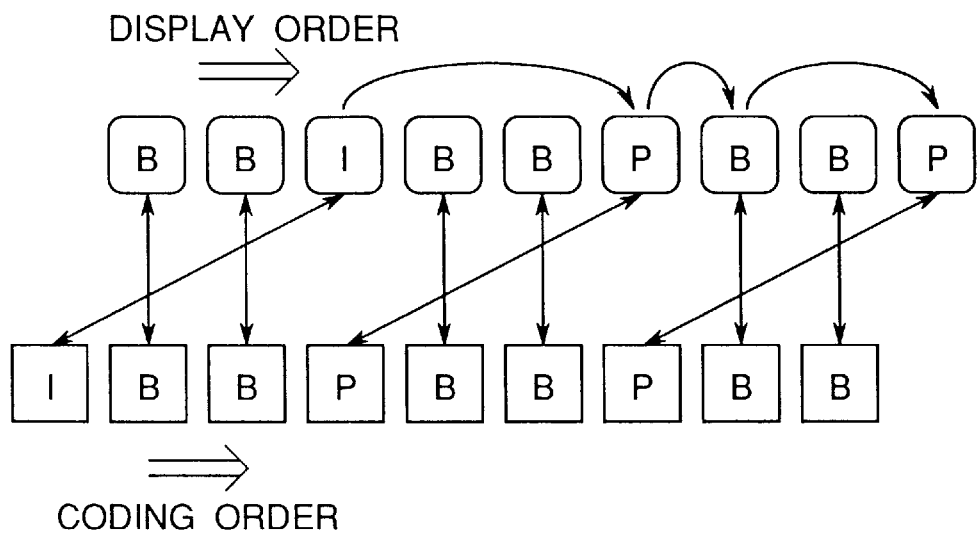
FIGS. 3(a) and 3(b) show the correlation between I, B, and P pictures in an MPEG video stream.
Figure 3B:
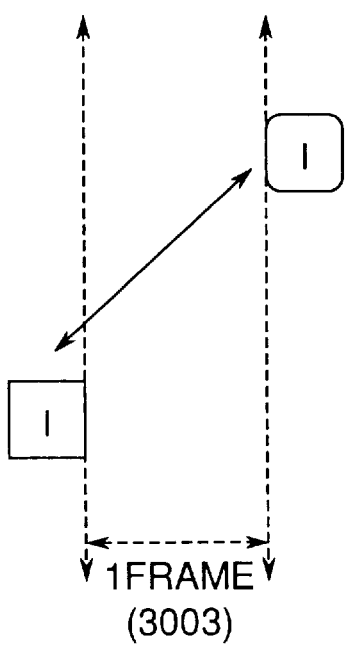

The relationship between I, P, and B pictures is shown in FIG. 3. As will be known from FIG. 3, P pictures are coded with reference to the closest preceding I or P picture, and B pictures are coded with reference to the closest preceding and following I or P pictures. As also shown in FIG. 3, the picture display order and the coding order of the compressed data are different because each B picture is also dependent on an I or P picture that is presented after the B picture.

The second feature of MPEG compression is dynamic (coding) data allocation by picture unit based on image complexity. An MPEG decoder has an input buffer for storing the input data stream, thus enabling a large (coding) data size (that is, more data) to be allocated to complicated images that are more difficult to compress.

MPEG also supports MPEG audio, a separate MPEG encoding standard for audio data to be reproduced with moving picture data. In addition, however, MPEG also supports the use of various other types of audio encoding for specific applications.

The present invention allows for two types of audio data encoding, that is, encoding with data compression and encoding without data compression. Exemplary audio encoding methods with data compression include MPEG audio and Dolby(R) Digital (AC-3); linear pulse code modulation (LPCM) is typical of audio encoding without data compression. Both AC-3 and LPCM are fixed bit rate coding methods. MPEG audio can select from among several different bit rates on an audio frame unit basis, although the range of bit rates is not as great as that available for video stream coding.

The MPEG system then multiplexes the encoded moving picture data and audio data into a single stream, which is referred to as the MPEG system stream. This multiplexed moving picture data and audio data is commonly referred to as AV data.

Figure 4:
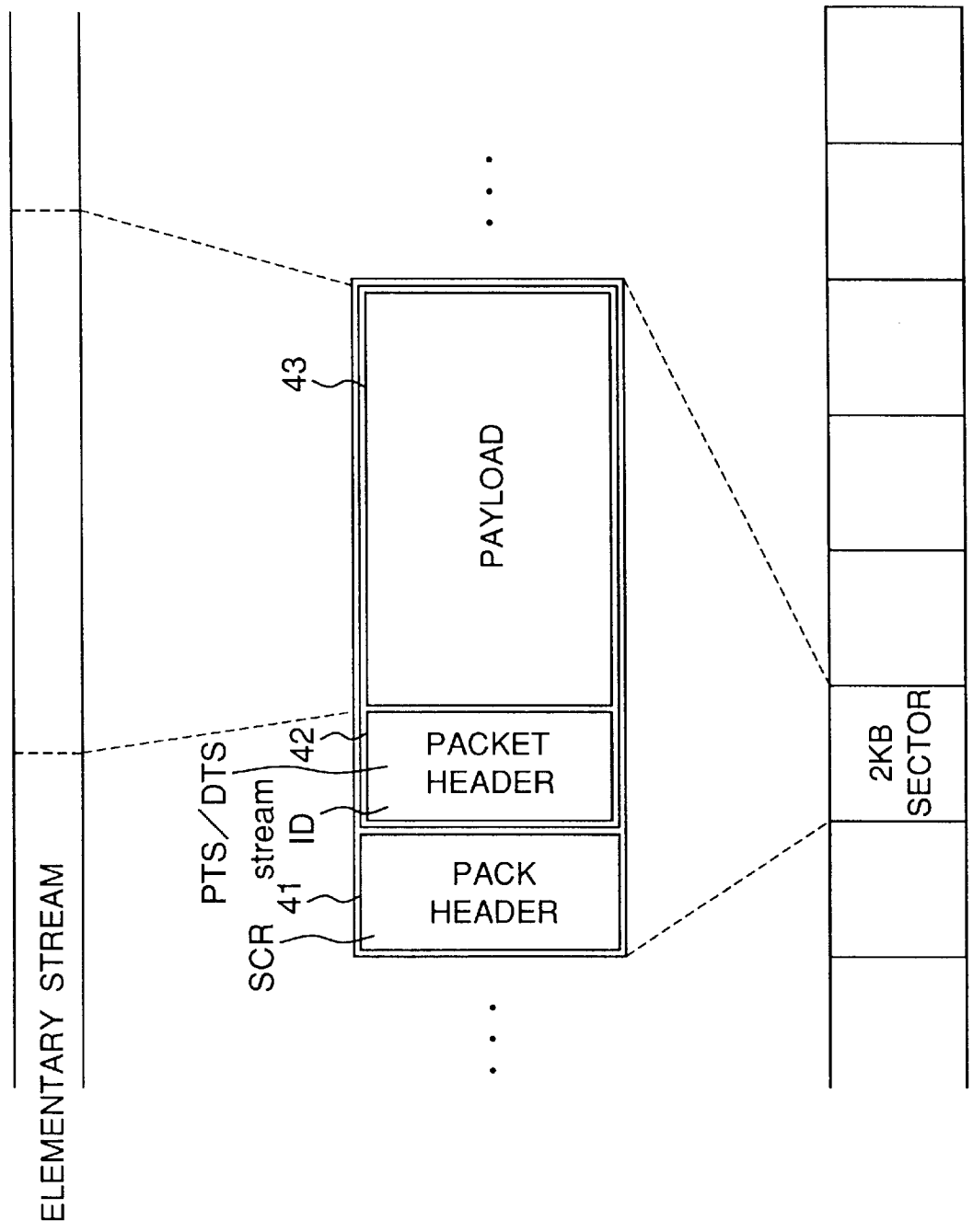
FIG. 4 shows the structure of an MPEG system stream.

The structure of the MPEG system stream is shown in FIG. 4. As shown in FIG. 4, the MPEG system stream is a hierarchical structure of packs and packets containing a pack header 41, packet header 42, and payload 43.

The packet is the smallest multiplexing unit, and the pack is the smallest data transfer unit.

Each packet comprises a packet header 42 and payload 43. AV data is divided into segments of an appropriate size starting from the beginning of the AV data stream, and these data segments are stored in the payload 43. The packet header 42 contains a stream ID for identifying the type of data stored to the payload 43, and a time stamp used for reproducing the data contained in the payload 43. This time stamp is expressed with 90 kHz precision. Data types identified by the stream ID include moving picture and audio. The time stamp includes both a decoding time stamp DTS and presentation time stamp PTS. The decoding time stamp DTS is omitted when decoding and presentation occur simultaneously, as with audio data.

A pack typically contains a plurality of packets. In this preferred embodiment of the present invention, however, one pack contains one packet. Thus, one pack comprises pack header 41 and one packet (comprising packet header 42 and payload 43) as shown in FIG. 4.

The pack header 41 contains a system clock reference SCR expressing with 27 MHz precision the time at which the data in that pack is input to the decoder buffer.

A decoder for decoding the above-noted MPEG system stream is described next below.

Figure 5:
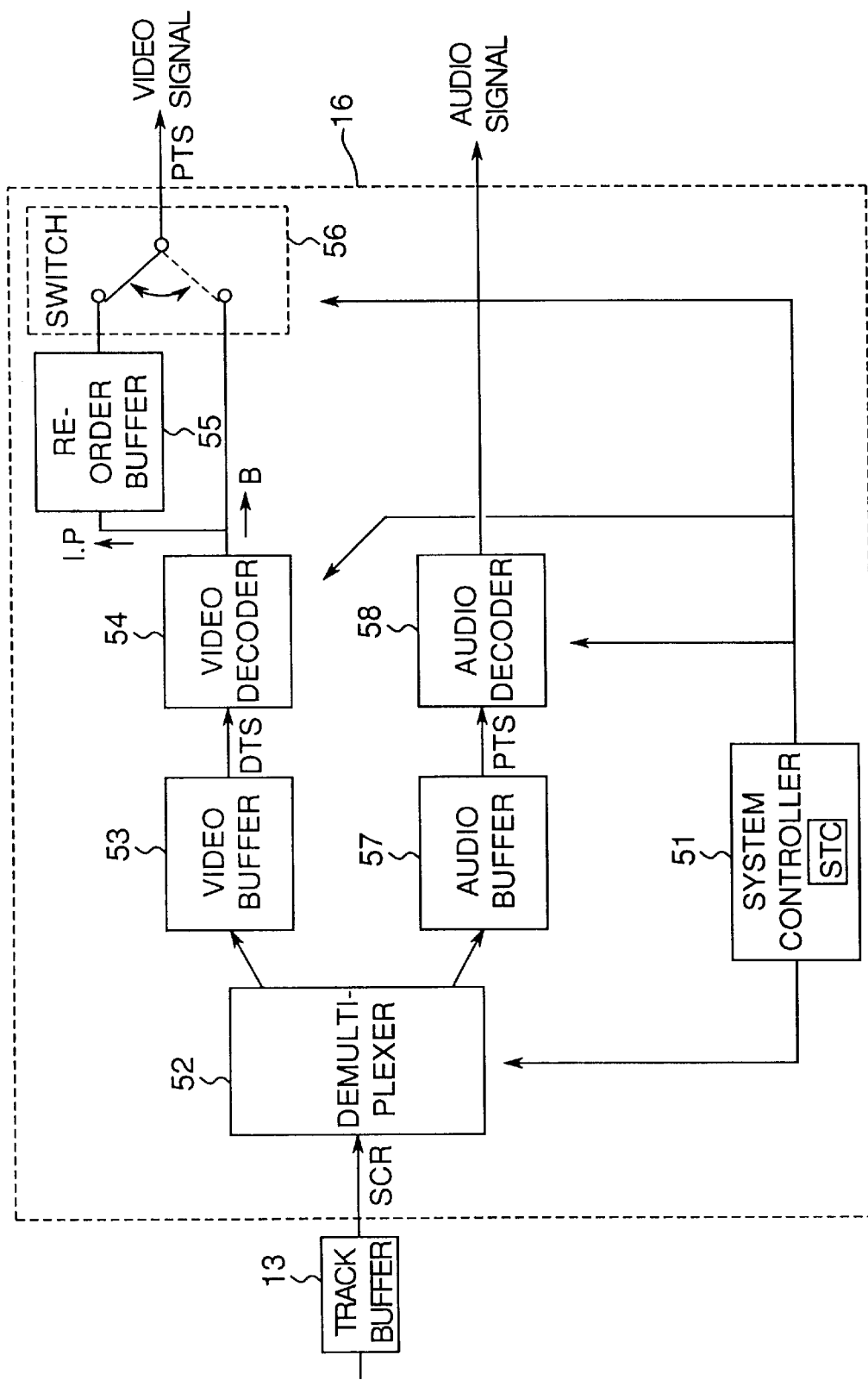
FIG. 5 is a block diagram of an MPEG system stream decoder (P_STD)
Figure 7A:
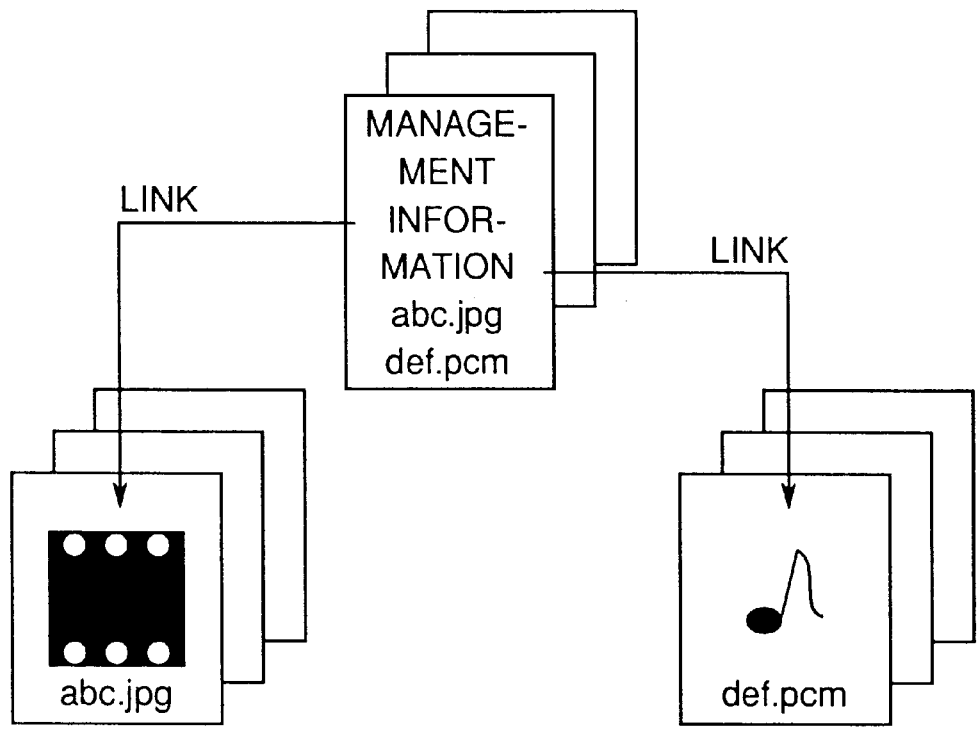
FIGS. 7(a) and 7(b) illustrate links between still pictures and audio in a digital still camera, according to prior art.
Figure 7B:
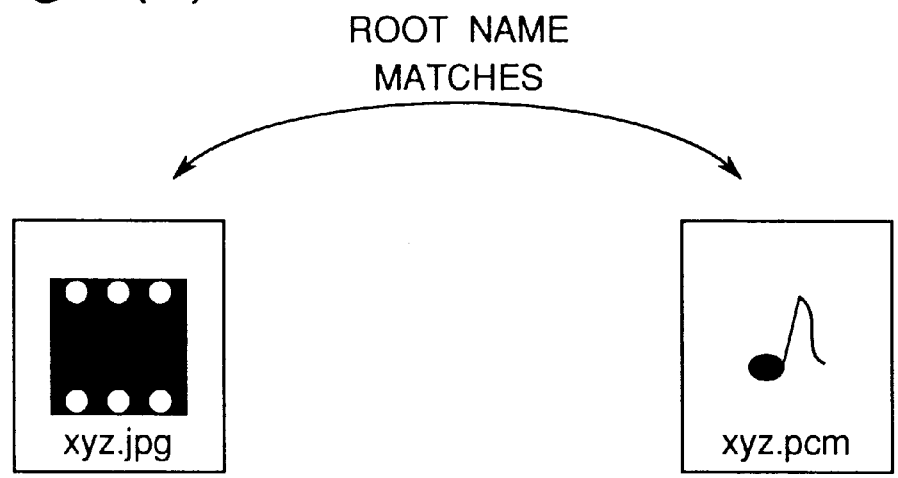

FIG. 5 is a block diagram of a model MPEG system decoder (P_STD), particularly showing the detail of decoder 16. Shown in FIG. 5 are a system controller 51 with a system time clock STC, an internal reference clock for the decoder; a demultiplexer 52 for demultiplexing, that is, decoding, the system stream; a video decoder input buffer 53; video decoder 54; a re-ordering buffer 55 for temporarily storing I and P pictures in order to absorb the delay between the display order and decoding order that occurs between I and P pictures and the dependent B pictures; a switch 56 for adjusting the output sequence of the I, P, and B pictures in the re-ordering buffer 55; an audio decoder input buffer 57; and an audio decoder 58.

The operation of this MPEG system decoder when processing an MPEG system stream is described next.

When the time indicated by the STC 51 matches the system clock reference SCR recorded in a pack header, the corresponding pack must be input to the demultiplexer 52. Note that the STC 51 is initialized to the system clock reference SCR at the first pack in the system stream. The demultiplexer 52 then interprets the stream ID in the packet header, and transfers the payload data to the decoder buffer appropriate to each stream. The demultiplexer 52 also extracts the presentation time stamp PTS and decoding time stamp DTS. When the time indicated by the STC 51 and the decoding time stamp DTS match, the video decoder 54 reads and decodes the picture data from the video buffer 53. If the decoded picture is a B picture, the video decoder 54 presents the picture. If the decoded picture is an I or P picture, the video decoder 54 temporarily stores the picture to the re-ordering buffer 55 before presenting the picture.

The switch 56 corrects the difference between the decoding sequence and the presentation sequence as described above with reference to FIG. 3. That is, if a B picture is output from the video decoder 54, the switch 56 is set to pass the video decoder 54 output directly from the system decoder. If an I or P picture is output from the video decoder 54, the switch 56 is set to output the output from the re-ordering buffer 55 from the system decoder.

It should be noted that I pictures cannot be simultaneously decoded and presented because the picture sequence must be reordered to correct the differences between the decoding order and the display order. Even if no B pictures are present in the system stream, there is a delay of one picture, that is, one video frame period, between picture decoding and presentation.

Similarly to the video decoder 54, the audio decoder 58 also reads and decodes one audio frame of data from the audio buffer 57 when the time indicated by the STC 51 and the presentation time stamp PTS match (note that there is no decoding time stamp DTS present in the audio stream).

MPEG system stream multiplexing is described next with reference to FIG. 6. FIG. 6(a) shows several video frames, FIG. 6(b) represents the video buffer state, FIG. 6(c) shows the MPEG system stream, and FIG. 6(d) shows the audio signal (audio data). The horizontal axis in each figure represents the time base, which is the same in each figure. The vertical axis in FIG. 6(b) indicates how much data is stored in the video buffer at any given time; the solid line in FIG. 6(b) indicates the change in the buffered data over time. The slope of the solid line corresponds to the video bit rate, and indicates that data is input to the buffer at a constant rate. The drop in buffered data at a regular period indicates that the data was decoded. The intersections between the diagonal dotted lines and the time base indicate the time at which video frame transfer to the video buffer starts.

2. Problems with a Conventional MPEG Stream

Digital cameras using a conventional MPEG stream as described above are not believed to be presently available as commercial products because of the problems described below. For the convenience of the following description, however, it is herein assumed that this hypothetical digital camera exists.

The relationship between the reproduction operation of an MPEG stream decoder in this hypothetical digital camera and the various time stamps (STC, PTS, DTS) is described first with reference to FIGS. 17 and 18. Note that the decoder is assumed to be comprised as shown in FIG. 5.

Figure 17A:
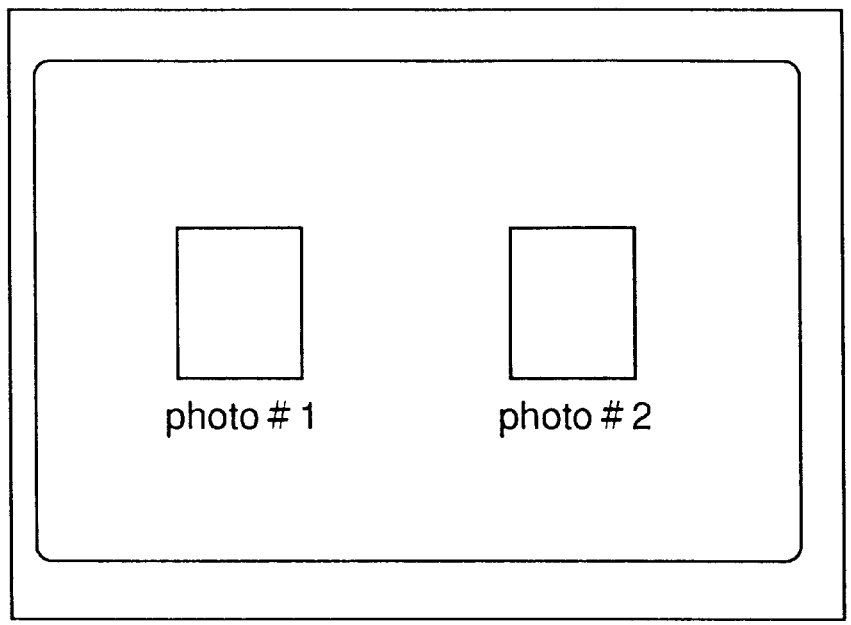
FIGS. 17(a) and 17(b) are explanatory views showing two still pictures.
Figure 17B:
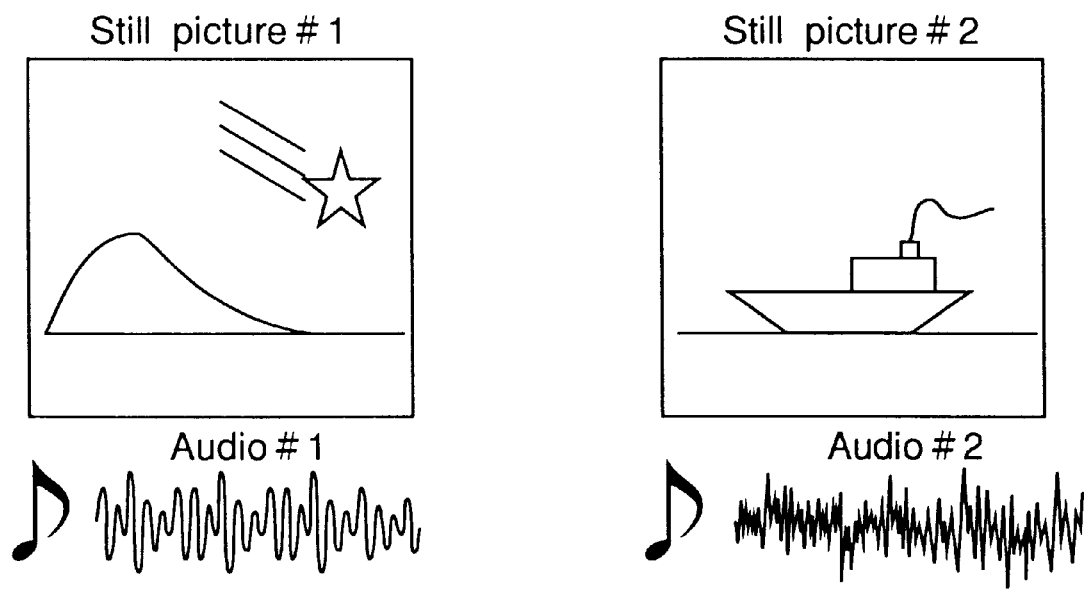

FIG. 17 is used to describe the operation for reproducing data captured by the digital camera on a personal computer (PC). An exemplary screen presented on the PC display is shown in FIG. 17(a). Photo #1 and photo #2 represent separate image files displayed on the screen in the form of icons. In a graphical user interface (GUI) such as Windows 95 (R), photos #1 and #2 may be presented as thumbnail sketches, for examples, which a user can click on using a mouse or other pointing device. The PC then presents the file content corresponding to the photograph that was clicked on by displaying the image on screen and outputting the audio from a speaker connected to the PC. FIG. 17(b) shows the content displayed for photo #1 and photo #2 in this example.

When a user clicks on photo #1 in FIG. 17(a) in this example, still picture #1 is presented on screen, and audio #1 is output from the PC speaker, as shown in FIG. 17(b). Likewise when the user clicks on photo #2, still picture #2 is presented on screen, and audio #2 is output from the PC speaker.

The relationship between decoder operation in this hypothetical digital camera and the various time stamps when photo #1 is reproduced is shown in FIG. 18 and described below.

The video output, still picture #1, and audio output, audio #1, that are output for photo #1 are shown in FIGS. 18(a) and 18(b). FIGS. 18(c) and 18(d) show the change in the data stored to the video buffer 53 and audio buffer 57 as still picture #1 and audio #1 are decoded and output. FIG. 18(e) shows the pack sequence and time stamps (SCR, PTS, DTS) stored in each pack when photo #1 is stored to disc as stream #1, which is an MPEG stream in this example.

It should be noted that while not shown in the figure, the DTS and PTS are stored in the packet header of each packet as described above. It will also be obvious to one with ordinary skill in the related art that while only four video packs and two audio packs are shown for simplicity, there are actually more than 100 audio packs and video packs each because each pack is a maximum 2 KB.

The reproduction operation of this hypothetical digital camera starts by sending the packs contained in stream #1 shown in FIG. 18(e) to the demultiplexer 52.

As shown in FIG. 18(e), stream #1 is multiplexed with the packs in the following sequence, starting from the beginning of the stream: video pack V1, video pack V2, audio pack A1 video pack V3, video pack V4, audio pack A2. The pack header of each pack contains a system clock reference SCR, which indicates the timing at which that pack is input to the demultiplexer 52. In the example shown in FIG. 18, time t1 is stored to system clock reference SCR #1 of video pack V1, time t2 is stored to SCR #2 of video pack V2, time t3 is stored to SCR #3 of audio pack A1, time t4 is stored to SCR #4 of video pack V3, time t5 is stored to SCR #5 of video pack V4, and time t6 is stored to SCR #6 of audio pack A2.

The PTS and DTS are also written to the first pack of each picture. Time t7 is thus written to PTS #1 of video pack V1, and time t6 is written to DTS #1. Note that the PTS and DTS are the same for every video pack in a picture, and are therefore not written to any but the first video pack.

The PTS is written to every audio pack. Therefore, time t7 is written to PTS #1 for audio pack A1, and time t9 is written to PTS #2 for audio pack A2. Note, further, that the PTS is written and the DTS is omitted in audio packs because the PTS and DTS are the same in an audio pack. The STC is reset at time t1, the value of SCR #1 in video pack V1, that is, the first pack in stream #1, and each pack in the stream #1 is then input to the demultiplexer 52 at the indicated by the SCR value in the pack header.

Therefore, as shown in FIG. 18(e), video pack V1 is input to the demultiplexer 52 first at time t1, then video pack V2 is input at time t2, audio pack A1 is input at time t3, video pack V3 is input at time t4, video pack V4 is input at time t5, and audio pack A2 is input at time t8. Video packs input to the demultiplexer 52 are then output to the video buffer 53, and audio packs are output to the audio buffer 57.

The second part of the reproduction operation of this hypothetical digital camera described below is the data decoding and output operation of the video packs output to the video buffer 53.

As shown in FIG. 18(c), while there is an ignorable delay between the video packs output from the demultiplexer 52, the video packs are accumulated to the video buffer 53 at the system clock reference SCR timing, that is, at time t1, t2, t4, and t5. Still picture #1 comprises video packs V1 to V4. As a result, all video packs constituting still picture #1 have been stored to the video buffer 53 once video pack V4 has been stored to the video buffer 53. As shown in FIG. 18(e), the decoding time stamp DTS of still picture #1 comprising video packs V1 to V4 is time t6. The data accumulated to the video buffer 53 is therefore decoded by video decoder 54 at time t6, and the data is cleared from the video buffer, thereby increasing the available buffer capacity.

The decoded video pack data of still picture #1 is an I picture. The decoded I picture is stored to re-ordering buffer 55, and is output from the decoder at PTS time t7.

Note that the end presentation time for still picture #1 is not defined by an MPEG stream time stamp. As a result, presentation typically ends when reproduction of the next MPEG stream begins, or when video output is terminated by a control command sent to the decoder from another application or device. The example shown in FIG. 18 therefore shows presentation of still picture #1 continuing even after time t10, the time at which audio output ends.

The third part of the reproduction operation of this hypothetical digital camera described below is the relationship between the time stamps and the operation whereby audio pack data output to the audio buffer 57 is decoded and output.

As shown in FIG. 18(d), the audio packs output from the demultiplexer 52 are stored to the audio buffer 57 at time t3 and t8, thus increasing the amount of data stored to the audio buffer 57. Unlike the video data, the PTS and DTS are the same in the audio data. As a result, audio data is output at the same time the audio decoder 58 [57, sic, and below] decodes the audio pack data. More specifically, the audio pack A1 data stored to audio buffer 57 is decoded by audio decoder 58 at the presentation time stamp PTS, i.e., time t7, and audio output begins. The audio pack A2 data stored to the audio buffer 57 at time t8 is then decoded and output at the PTS, that is, time t9, by audio decoder 58.

The time that data can be stored to each decoder buffer is also limited in the MPEG system. This limit is 1 sec. in the case of moving picture data. This means that the maximum difference between the transfer times of simultaneously output audio and video data, that is, the maximum SCR difference, is 1 second. However, a delay equal to the time required to reorder the video data may also occur.

3. MPEG Stream Problems

Through years of research and development, the inventors have identified and organized problems presented by the conventional MPEG stream described above with respect to using the MPEG stream in a digital still picture camera.

As noted above, the MPEG system stream contains video data and the audio data presented with that video data multiplexed into a single system stream. Editing this system stream to change the audio presented with a particular video image is therefore difficult once the audio and video streams have been multiplexed into a single system stream. This means that when a digital camera uses an MPEG stream to encode and store a still picture and the audio recorded when that picture was taken to a recording medium, it is difficult to later edit the audio to replace the audio recorded when the picture was taken with a different audio signal.

Referring to the example shown in FIG. 17, when photo #1 is captured by a digital still picture camera, photo #1 is recorded by the camera to a disc or other recording medium as an MPEG stream multiplexing still picture #1, that is, the still picture data, and audio #1, that is, the audio data captured at the same time. The resulting MPEG stream thus comprises multiplexed video packs and audio packs as shown in FIG. 18(e). As a result, after the user takes a picture, it is difficult to change the audio data of photo #1 from audio #1 to a different audio signal.

Though difficult, the following three methods of editing the audio data after recording are conceivable.

(1) Generate a plurality of MPEG streams, each multiplexing the video data (the photographed still picture data) with one of a plurality of audio data streams that might be used with the video data, and record all of these plural MPEG streams to the recording medium. This method means that in the example shown in FIG. 18, a number of other streams, each containing the same video packs but a different selection of audio packs, is recorded in addition to stream #1 shown in FIG. 18(e). There is a limit to the number of MPEG streams that can be recorded, however, because the storage capacity of the recording medium is also limited. More particularly, however, it is not practically possible for the user to record at the time the picture is taken all audio data that might be desirably combined with the still picture.

(2) Decode the MPEG stream during editing to separate the still picture data from the audio data, and then re-encode the system stream with the still picture data and the new audio data. This method, however, requires system stream decoding and encoding each time the audio is edited, thus increasing the required editing time. The entire system stream is also stored as decoded (uncompressed) data, thus requiring a large amount of memory in the digital camera.

(3) Record the video stream and audio stream as two separate (unmultiplexed) streams, and determine what audio stream to use with a particular video stream at the time of reproduction. This method makes it possible to add audio data after recording a still picture to the recording medium, and then reproduce the added audio data when reproducing the still picture.

The inventors of the present invention have used the above method (3). More specifically, the present invention provides a method and apparatus for reproducing two MPEG streams stored separately on disc as though they are a single MPEG stream using a conventional MPEG decoder.

MPEG Stream According to the Present Invention

To achieve the present invention by using a conventional decoder to reproduce two separate MPEG streams, one for still picture data and one for audio data, as noted above, it is necessary to drive the decoder to process the two MPEG streams as a single system stream.

The first problem to be overcome in processing two MPEG streams as though they are a single system stream is that a discrete time stamp is assigned to the two streams. When the two streams are processed continuously as one stream, contradictions such as a discontinuity between the time stamps assigned to the two streams can occur.

While the time stamps in the MPEG stream are multiplexed into the data, the initial time stamp value (the first system clock reference SCR in the stream) in a normal MPEG stream is not defined by the MPEG standard. In practice, therefore, the encoder assigns a specific value.

It will therefore be obvious that there is no continuity or correlation between the time stamps assigned to MPEG streams generated by different encoders. Assume, for example, that encoder A generates an MPEG stream A encoded with an initial SCR of 0, and an encoder B generates an MPEG stream B encoded with an initial SCR of 1000. The SCR of the last pack in stream A is 27000000 (27 MHz). Here, (27 MHz) indicates that the number preceding (27 MHz) is a counted value using 27 MHz clock. Streams A and B are to be continuously processed by the decoder as a single stream. A discontinuity occurs in the SCR in this case between the end of stream A and the beginning of stream B, and there is a strong possibility that the decoder hangs up or other error occurs.

To resolve this problem, a recording apparatus according to the present invention limits the values of the time stamps (SCR, PTS, DTS) in the system streams that are generated and recorded to disc.

The MPEG stream time code limits imposed by the present invention are described next below.

FIG. 11 is referred to below to describe the time stamps used for the still picture data system stream ST1 and the audio data system stream ST2 in this preferred embodiment of the present invention.

FIG. 11(a) shows the structure of the system stream for still picture data, referred to as a video object (VOB). System clock reference SCR1 is written to the pack header of the first pack in the VOB, and PTS1 and DTS1 are written to the packet header of the first VOB. SCR2 is written to the pack header of the last pack.

FIG. 11(b) shows the VOB for the audio data system stream ST2. SCR3 is written to the pack header of the first pack in this VOB, and PTS3 is written to the packet header.

FIG. 11(c) shows the sequence in which the still picture data and audio data system streams are input continuously to the decoder during reproduction.

In order to drive the decoder to process the still picture data system stream ST1 and audio data system stream ST2 as a single system stream, the values assigned to the system clock reference SCR2 in the last pack of the still picture data system stream ST1, and the system clock reference SCR3 in the first pack of the audio data system stream ST2, are limited as defined by equation (1) below in the present invention.

$$SCR2+Tp \leq SCR3 \qquad (1)$$

where Tp is the time required to transfer one pack to the decoder. More specifically, Tp is a time period from the moment when one pack starts to enter the demultiplexer 52 until said one pack completely enters the demultiplexer 52. Since the pack merely passes through the demultiplexer 52, it is also possible to say that Tp is a time period from the moment when one pack starts to enter the buffer 53 (or 57) unit said one pack completely enters the buffer 53 (or 57).

It should be noted that equation (1) limits the smallest value that can be assigned to SCR3. SCR3 is often set to zero (0) in a conventional MPEG stream. A recording apparatus according to the present invention, however, calculates the SCR3 value from equation (1).

By thus calculating the value of SCR3, SCR2 is prevented from being greater than SCR3, and the SCR values in each pack of the still picture data system stream ST1 and audio data system stream ST2 are assured of being in a rising numerical sequence from one system stream to the next.

Equation (1) also assures that the difference between SCR2 and SCR3 is at least Tp. This prevents the transfer timing of the first pack in the audio data system stream ST2 from conflicting with the transfer of the last pack in the still picture data system stream ST1, that is, transferring the first pack in the audio data system stream ST2 will not start while the last pack in the still picture data system stream ST1 is still being transferred.

It should be further noted that if the system stream transfer rate is 8 Mbps, the pack transfer time TP will be 55296 (27 MHz); if 10.08 Mbps, the pack transfer time Tp will be 43885 (27 MHz).

A decoder according to the present invention is further comprised to accept input of the audio data system stream ST2 following a still picture data system stream ST1 without first resetting the STC after input thereto of a still picture data MPEG stream has been completed. This is because it would be meaningless to limit the value of the SCR in the first audio stream pack if the decoder resets the STC after still picture data input, as it conventionally does after each system stream.

By thus driving the decoder to process supplied system streams based on time stamp values calculated as described above, the decoder can handle separate still picture data and audio data system streams as a single MPEG stream. That is, a still picture data stream and a separately recorded audio data stream can be reproduced as though they are a single system stream.

The presentation time stamps PTS1 and PTS3 are also set to the same specified value as shown in equation (2) below.

$$PTS1=PTS3=\text{specified value} \qquad (2)$$

This assures that both audio and still picture data output begin at the same time.

In this exemplary embodiment of the present invention, this specified value is $$90000\ (90\ \text{kHz}) + Tv$$

where Tv is the video frame period, and (90 kHz) indicates that the number preceding (90 kHz) is a counted value using 90 kHz clock. In an NTSC signal, Tv is therefore 3003; in a PAL signal, it is 3600.

The time stamps shown in FIG. 11 are described more specifically below with reference to a case in which still picture data and audio output begin simultaneously at approximately 1 second (90000 (90 kHz)+Tv) after data reading based on the time stamps calculated from the above equations (1) and (2).

The time stamp for the still picture data VOB is described first.

(1) The system clock reference SCR (SCR1) for the first pack in the still picture data VOB is 0 (27 MHz).

(2) The decoding time stamp DTS (DTS1) for the first pack in the still picture data VOB is 90000 (90 kHz). Note that a still picture data VOB contains only one still picture.

(3) The presentation time stamp PTS (PTS1) for the first pack in the still picture data VOB is 93003 (90 kHz). Note that PTS1=93003 is for an NTSC video signal; for a PAL video signal, PTS1=93600. This is because the video frame period (Tv) in an NTSC signal is 3003, and is 3600 in a PAL signal. Note, further, that because a still picture data VOB contains only one still picture, all packs are output simultaneously at the time indicated by PTS1.

(4) The SCR (SCR2) of the last pack in the still picture data VOB is set to a value 27000000 (27 MHz) minus the transfer time of one pack (Tp).

The value 27000000 (27 MHz) is called a base value below.

This base value is set so that the longest delay between when moving picture data is input to the decoder buffer and when it is decoded is 1 second (27000000 (27 MHz)).

More specifically, if the maximum moving picture data storage time is applied to still picture data, all packs in the still picture data VOB must be transferred to the decoder within 1 second (27000000 (27 MHz)). If SCR1 for the first pack is 0, the data stored in the first pack will be decoded within 1 second (27000000 (27 MHz)) after it is transferred to the decoder, and the SCR (SCR2) of the last pack in the same still picture data VOB is therefore pack transfer time Tp less than 27000000 (27 MHz).

The PTS value and this base value are defined as described above to ensure encoder compatibility. In other words, if the still picture data system stream ST1 and audio data system stream ST2 are encoded using the values derived from equations (1) and (2), the above specified PTS value, and the above base value, the present invention can be applied regardless of what encoder generates the system streams.

It should be noted that the base value is defined in this preferred embodiment as 27000000 (27 MHz). The following equations (3) and (4) can therefore be derived where this base value is MaxT.

$$SCR2 + Tp \leq MaxT \quad (3)$$

$$SCR3 = MaxT \quad (4)$$

The time stamps of the audio data VOB are described next.

(1) The system clock reference SCR (SCR3) of the first audio pack is 27000000 (27 MHz). Using this value, the audio pack will be input to the decoder continuously to the preceding still picture data VOB at the shortest time satisfying equation (1). In addition, because the still picture data PTS1 is 93003 (90 kHz), the SCR must be set to a smaller value in order to simultaneously output the audio.

(2) The presentation time stamp PTS (PTS3) of the first audio frame in the VOB is 93003 (90 kHz). As noted above, this is for an NTSC video signal; if PAL video, PTS3 is 93600.

It will also be obvious to one with ordinary skill in the related art that insofar as the still picture data VOB and audio data VOB are encoded to satisfy equations (1) and (2), the present invention shall not be limited to the conditions (values) described above.

For example, if the video is an NTSC signal and the first SCR is 27000000 (27 MHz) rather than 0, the following values apply.

SCR1=27000000 (=1 sec)

SCR2≦53944704 (=SCR3−Tp)

SCR3=54000000 (=SCR1+1 sec)

PTS1=PTS3=183003 (=DTS1+3003)

DTS1=180000 (=1 sec)

If the video is an NTSC signal, the first SCR is 0, and PTS is 1 second, the following values apply.

SCR1=0

SCR2≦26043804 (=SCR3−Tp)

SCR3=26099100 (=1 sec−3003×300)

PTS1=PTS3=90000 (=1 sec)

DTS1=86997 (=PTS1−3003)

If the video is a PAL signal and the first SCR is 27000000 (27 MHz), the following values apply.

SCR1=27000000 (=1 sec)

SCR2≦53944704 (=SCR3−Tp)

SCR3=54000000 (=SCR1+1 sec)

PTS1=PTS3=183600 (=DTS1+3600)

DTS1=180000 (=1 sec)

If the video is a PAL signal, the first SCR is 0, and PTS is 1 second, the following values apply.

SCR1=0

SCR2≦25864704 (=SCR3−Tp)

SCR3=25920000 (=1 sec−3600×300)

PTS1=PTS3=90000 (=1 sec)

DTS1=86400 (=PTS1−3600)

If the transfer rate is 10.08 Mbps, and the video is an NTSC signal, the following values apply.

SCR1=0

SCR2≦26956115 (=SCR3−Tp (=43885))

SCR3=27000000 (=1 sec)

PTS1=PTS3=93003 (=DTS1+3003)

DTS1=90000 (=1 sec)

If the transfer rate is 10.08 Mbps, and the video is a PAL signal, the following values apply.

SCR1=0

SCR2≦26956115 (=SCR3−Tp (=43885))

SCR3=27000000 (=1 sec)

PTS1=PTS3=93600 (=DTS1+3600)

DTS1=90000 (=1 sec)

An operation whereby an MPEG stream having time stamps defined as described above is processed by an exemplary decoder is described next below with reference to FIG. 19 and FIG. 20. Note that this decoder is comprised as shown in FIG. 5.

Like FIG. 18, FIG. 19 shows the relationship between decoder operation in digital still camera according to the present invention and the various time stamps when photo #1 is reproduced.

The video output, still picture #1, and audio output, audio #1, that are output for photo #1 are shown in FIGS. 19(*a*) and 19(*b*). FIGS. 19(*c*) and 19(*d*) show the change in the data stored to the video buffer 53 and audio buffer 57 as still picture #1 and audio #1 are decoded and output. FIG. 19(*e*) shows the pack sequence and the time stamps (SCR, PTS, DTS) written to each pack of the video stream #1 and audio stream #1, both of which are MPEG streams, when photo #1 is stored to disc as two streams #1 and #2.

It should be noted that the packet structure and further description thereof are omitted here as in FIG. 18.

The first part of the description of the reproduction operation of a digital still camera according to the present invention starts with the operation for transferring the packs of streams #1 and #2 shown in FIG. 19(*e*) to the demultiplexer 52.

As shown in FIG. 19(*e*), stream #1 comprises video pack V1, video pack V2, video pack V3, and video pack V4 multiplexed in sequence from the beginning of the stream. Stream #2 likewise comprises audio pack A1 and audio pack A2 multiplexed in sequence starting from the beginning of the stream. It is important to note here that stream #1 comprises only video packs, and stream #2 comprises only audio packs.

The pack header of each pack also contains a system clock reference SCR. As shown in FIG. 19(*e*), SCR#1 of video pack V1 in stream #1 is time t1; SCR#2 of video pack V2 is time t2; SCR#3 of video pack V3 is time t3; and SCR#4 of video pack V4 is time t4. The presentation time stamp PTS and decoding time stamp DTS are also set in the first video pack in the video stream V1. PTS#1 in video pack V1 is time t8, and DTS#1 is time t6.

In this preferred embodiment as described above, the value of time t1, that is, the value of SCR#1 in the first video pack V1, is 0. The value of SCR#4 in the last video pack V4 is likewise 27000000 (27 MHz)−Tp, where Tp is the pack transfer time described above and is 55296 (27 MHz). Assuming that the video data is NTSC coded, time t8 of PTS#1 is 93003 (90 kHz), and time t6 of DTS#1 is 90000 (90 kHz).

The system clock reference SCR#5 of the first audio pack A1 in stream #2 is time t7, and SCR#6 of audio pack A2 is time t9. A presentation time stamp PTS is also set in audio packs A1 and A2. PTS#5 in audio pack A1 is time t8, and PTS#6 in audio pack A2 is time t10.

In this preferred embodiment as described above, the value of time t7, that is, the value of SCR#5 in the first audio pack A1, is 27000000 (27 MHz). Time t8 of PTS#5 in audio pack A1 is the same as the video data PTS, that is, 93003 (90 kHz).

The system time clock STC is reset to time t1, the value of SCR#1 in the first video pack V1, and each pack in stream #1 is then input to the demultiplexer 52 at the time indicated by the SCR of each pack.

That is, as shown in FIG. 19(*e*), the first video pack V1 is input to the demultiplexer 52 at time t1, video pack V2 is input at time t2, video pack V3 at time t3, and video pack V4 at time t4.

The decoding process of a digital still camera according to the present invention differs from a conventional camera as described with reference to FIG. 18 in that the system time clock STC of the decoder is not reset after all of stream #1 is input, and the packs of stream #2 are input continuously to the demultiplexer 52 at the SCR timing written to each pack.

The first audio pack A1 in stream #2 is thus input to the demultiplexer 52 at time t7, and audio pack A2 is input at time t9.

It is important to note here that the SCR#4 of the last video pack V4 and the SCR#5 of the first audio pack A1 are set to satisfy equation (1) above, which can thus be restated as follows.

$$SCR\#4 + Tp \leq SCR\#5 \tag{1}$$

Continuity between the SCR values of stream #1 and stream #2 is thus assured, the interval therebetween is at least equal to the pack transfer time, and the decoder can thus continuously process two streams without hanging up.

The demultiplexer 52 outputs video packs input thereto to the video buffer 53, and outputs audio packs input thereto to the audio buffer 57.

The second part of the reproduction operation of a digital camera according to the present invention described below is the data decoding and output operation of the video packs output to the video buffer 53.

As shown in FIG. 19(*c*), while there is an ignorable delay between the video packs output from the demultiplexer 52, the video packs are accumulated to the video buffer 53 at the SCR timing, that is, at time t1, t2, t3, and t4. Still picture #1 comprises video packs V1 to V4. As a result, all video packs constituting still picture #1 have been stored to the video buffer 53 once video pack V4 has been stored to the video buffer 53. As shown in FIG. 19(*e*), the decoding time stamp DTS of still picture #1 comprising video packs V1 to V4 is time t6. The data accumulated to the video buffer 53 is therefore decoded by video decoder 54 at time t6, and the data is cleared from the video buffer, thereby increasing the available buffer capacity.

The decoded video pack data of still picture #1 is an I picture. The decoded I picture is stored to re-ordering buffer 55, and is output from the decoder at PTS time t8.

The third part of the reproduction operation of a digital camera according to the present invention described below is the relationship between the time stamps and the operation whereby audio pack data output to the audio buffer 57 is decoded and output.

As shown in FIG. 19(*d*), the audio packs output from the demultiplexer 52 are stored to the audio buffer 57 at time t7 and t9, thus increasing the amount of data stored to the audio buffer 57. Unlike the video data, the PTS and DTS are the same in the audio data. As a result, audio data is output at the same time the audio decoder 58 [57, sic, and below] decodes the audio pack data. More specifically, the audio pack A1 data stored to audio buffer 57 is decoded by audio decoder 58 at the presentation time stamp PTS, i.e., time t8, and audio output begins. The audio pack A2 data stored to the audio buffer 57 at time t9 is then decoded and output at the PTS, that is, time t10, by audio decoder 58.

It is important to note here that the PTS is the same in the still picture data stream #1 and the audio data stream #2. As a result, stream #1 and stream #2 are input to the decoder at different times, but are output at the same time, which is determined by the PTS.

It will therefore be obvious that insofar as the time stamps are within the limits defined above, an MPEG stream comprising only still picture data, and an MPEG stream comprising only audio data, can be processed continuously, one following the other, by a decoder, with the audio and video presentation occurring simultaneously.

It will also be obvious that by recording the still picture data MPEG stream and audio data MPEG stream separately to disk, the audio to be reproduced with a particular still picture can be freely and easily changed and edited after the still picture data is captured and recorded.

Assume, for example, that still picture #1 and audio #1 described above with reference to FIG. 19 are the data recorded to disk when the image was photographed. To later change the audio that is to be output simultaneously with the still picture #1, it is only necessary to record an MPEG stream encoded with time stamps derived from equations (1) and (2). An example of this new audio #2 additionally recorded as MPEG stream #3 is shown in FIG. 20.

Though not shown in the figures, management information indicating what audio data MPEG stream is to be reproduced simultaneously with the MPEG stream for still picture #1 is also recorded to disk. This management information can then be updated so that the MPEG stream for audio #2 is reproduced simultaneously with the MPEG stream for still picture #1 instead of the MPEG stream for audio #1.

DVD-RAM Description

DVD-RAM is described next below as a recording medium and recording format suitable for recording MPEG streams as described above.

Advances in high density recording technologies for rewritable optical discs have expanded their range of applications from computer data and music to image data. A typical conventional optical disc has a guide channel of either lands or grooves formed on the signal recording surface of the disc. This has meant that signals are recorded using only the lands or the grooves. The development of a land and groove recording method, however, has enabled signals to be recorded to both lands and grooves, thus approximately doubling the recording density of the disc.

Constant linear velocity (CLV) control is also an effective means of improving recording density, and the development of a zoned CLV control method has made it easier to implement CLV control.

How to utilize these high capacity optical discs to record AV data, including video and other image data, and achieve new products with features and functions far surpassing those of conventional AV products is a major concern for the industry.

It is also thought that the availability of large capacity, rewritable optical disc media will result in the primary medium for recording and reproducing AV materials changing from conventional tape media to optical disc media. The change from tape to disc media will also have wide-ranging effects on the functions and performance of AV equipment.

One of the greatest benefits to be gained from a switch from tape to disc media is a significant increase in random access performance. While it is possible to randomly access tape media, several minutes may be required to access a particular part of the tape due to the need to fast-forward and/or rewind in a linear fashion. When compared with the seek time of optical disc media, which is typically on the order of several 10 milliseconds, there is an obvious and significant improvement in random access performance achieved by a switch to disc media. Tape is therefore obviously unsuitable as a random access medium.

Random access also means that distributed (that is, non-contiguous) recording of AV material is possible with optical disc media, though impossible with conventional tape media.

Logic Structure of DVD-RAM Media

Figure 8A:
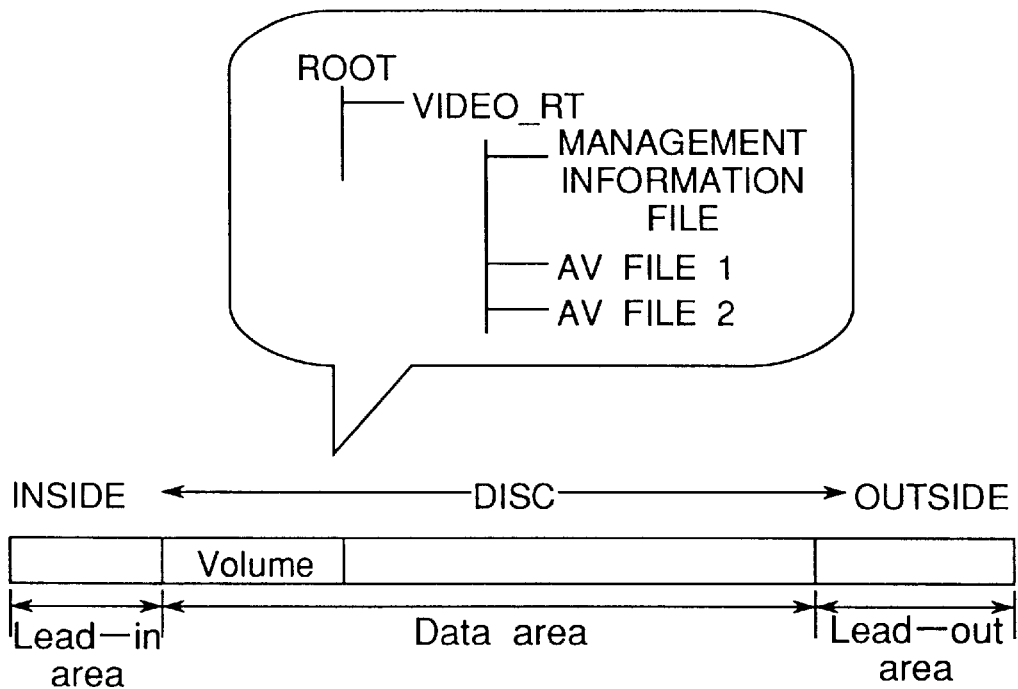
FIGS. 8(a) and 8(b) are diagrams showing two different styles of a directory structure and the physical arrangement of the disc recording surface.

The logic structure of DVD-RAM media is described next below with reference to FIG. 8. FIG. 8(a) shows the directory file and the organization of the disc recording area.

The recording area of the optical disc is arranged into a plurality of physical sectors in a spiral pattern from the inside circumference to the outside circumference of the disc.

The physical sectors of the disc are further allocated to one of three areas from the inside circumference to the outside circumference of the disc. A lead-in area is located at the inside circumference area of the disc. A lead-out area is located at the outside circumference area of the disc. A data area is provided between the lead-in and lead-out areas.

Each sector also has an address segment and a data segment. The address segment stores address information specifying the location of that sector on the optical disc, and an identifier identifying whether the sector is in the lead-in, data, or lead-out area. Digital data is stored to the data segment.

The data segment of sectors in the lead-in area contains information for initializing the device used to reproduce data from the disc (reproduction device). This information typically includes a reference signal required for servo stabilization, and an ID signal for differentiating one disc from another.

The data segment of sectors in the data area records the digital data constituting the application [? or user data ?] stored to the disc.

The lead-out area identifies the end of the recording area for the reproduction device.

Management information for managing disc content and constituting the file system is recorded to the beginning of the data area. This management information is the volume information. The file system is a table of contents for grouping a plurality of disc sectors into groups, and managing these disc sector groups. A DVD-RAM medium according to the present invention preferably uses the file system defined in ISO 13346.

An optical disc according to this preferred embodiment has a file directory structured as shown in FIG. 8(a).

All data handled by a DVD recording apparatus belongs to the VIDEO_RT directory directly under the ROOT directory.

There are two basic file types handled by a DVD recording apparatus: a single management information file, and at least one, though typically plural, AV files.

Management Information File

The content of the management information file is described next with reference to FIG. 9(a).

The management information file contains a VOB (video object) table and a PGC (program chain) table. A VOB is an MPEG program stream. The program chain defines the reproduction order of individual cells. A cell is a logic unit for reproduction, and corresponds to a particular part or all of a VOB. In other words, a VOB is a meaningful unit in an MPEG stream, and the PGC is unit reproduced by an MPEG stream reproducing apparatus.

The VOB table records the number of VOBs (Number_of_VOBs), and certain information about each VOB. This VOB information includes: the name of the corresponding AV file (AV_File_Name); the VOB identifier (VOB_ID); the start address in the AV file (VOB_Start_Address); the end start address in the AV file (VOB_End_Address); the VOB playback time (VOB_Playback_Time); and stream attributes (VOB_Attribute).

The PGC table records the number of PGCs (Number_of_PGCs) [Number_of_VOBs, sic], and certain information about each PGC. This PGC information includes: the number of cells in the PGC (Number_of_Cells), and certain cell information.

This cell information includes: the corresponding VOB_ID; the cell start time in the VOB (Cell_Start_Time); the cell playback time in the VOB (Cell_Playback_Time); the address at which cell playback starts in the VOB (Cell_

Start_Address) and the address at which cell playback ends (Cell_End_Address); an audio flag indicating that there is audio to be reproduced simultaneously with the still picture data (Audio_Flag). When Audio_Flag is set to 1, cell extension information exists for the related audio data, that is, the VOB_ID, Cell_Start_Time, Cell_Playback_Time, Cell_Start_Address, and Cell_End_Address. When Audio_Flag is reset to 0, cell extension information for the related audio data does not exist.

It is important here to note the audio flag (Audio_Flag), which is used to declare whether or not there is audio data to be output simultaneously with the still picture.

AV File

The AV file structure is described next with reference to FIG. 9(b).

An AV file has at least one, and typically plural, VOBs. VOBs are recorded continuously to disc, and VOBs associated with a particular AV file are arranged contiguously on disc. VOBs in an AV file are managed using the VOB info in the management information file. When the DVD reproducing apparatus first accesses the management information file, it reads the VOB start and end addresses, and is thus able to access the VOB.

The logical reproduction unit of the VOB is the cell. A cell is a part of the VOB to be reproduced; it may correspond to the entire VOB, and can be set as desired by the user. These cells make editing simple without actually manipulating the AV data. As with a VOB, cell access is managed using the cell information in the management information file. A DVD reproducing apparatus thus accesses the management information file to read the cell start and end address information in order to access a cell.

Cell address information is referenced to the VOB, and VOB address information is referenced to the AV file. As a result, the DVD reproducing apparatus accesses a cell by adding the cell address information to the VOB address information to calculate the address in the AV file, enabling the DVD reproducing apparatus to access the AV file.

Links between Still Picture Data and Audio Data

How a still picture and audio are synchronously reproduced is described next with reference to FIG. 10.

Figure 10A:
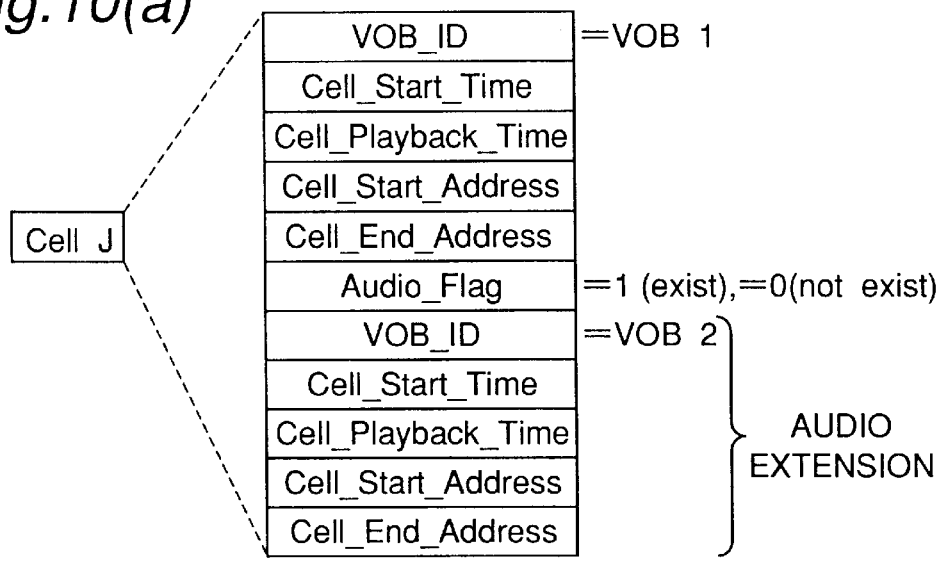
FIGS. 10(a), 10(b) and 10(c) show the management information data for still picture data and audio data, a data stream for the still picture data and audio data, and another data stream for the still picture data and audio data.

FIG. 10(a) shows part of the management information file described above. As shown in FIG. 10(a), cell information for a still picture contains access information (VOB_ID, Cell_Start_Time, Cell_Playback_Time, Cell_Start_Address, and Cell_End_Address) for the still picture data and the corresponding audio data.

The audio flag (Audio_Flag) declares whether there is audio data to be reproduced with the still picture data. Therefore, when the audio flag indicates that there is audio data to be reproduced with the still picture data, the cell also contains access information for the audio data VOB.

A relationship between still picture data and audio data is thus established by setting the audio flag (Audio_Flag) and declaring the VOB information for the audio data.

Figure 10B:
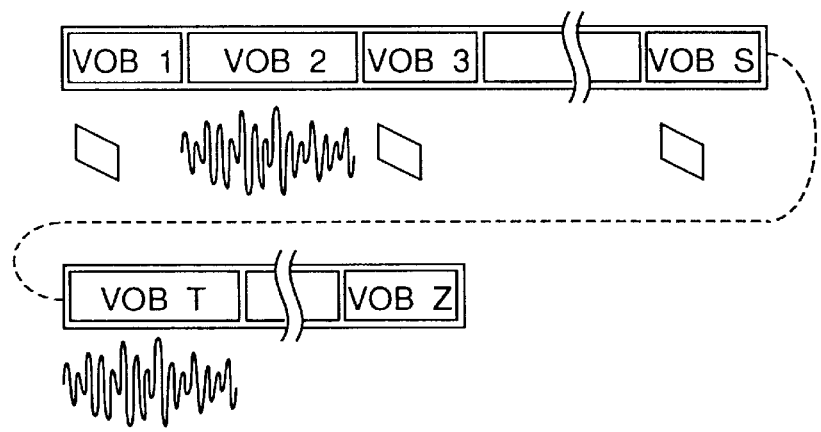

FIG. 10(b) shows an AV file for still picture data and audio data. Data stored in a VOB is either still picture data or audio data. There is no VOB that contains both still picture data and audio data in a multiplexed manner. Unlike moving picture data VOBs, in the present invention, still picture data VOBs comprise only a single I picture video frame, an intraframe compressed video image, and audio data VOBs contain only audio data. The still picture data and audio data playback control information is generated by referring to the cell information for the still picture data VOBs and audio data VOBs, and defining the still picture cell playback order from the PGC.

It is therefore possible to freely combine still picture data and audio data streams by defining the playback order of referenced cells for separately recorded still picture data and audio data.

It should be noted that while this preferred embodiment has been described as having two VOBs for one MPEG stream; one for the video data and the other for the audio data, the data structure is not limited as such as long as the audio data and the video data can be separated, and the separated audio data can be replaced with another audio data.

Figure 10C:
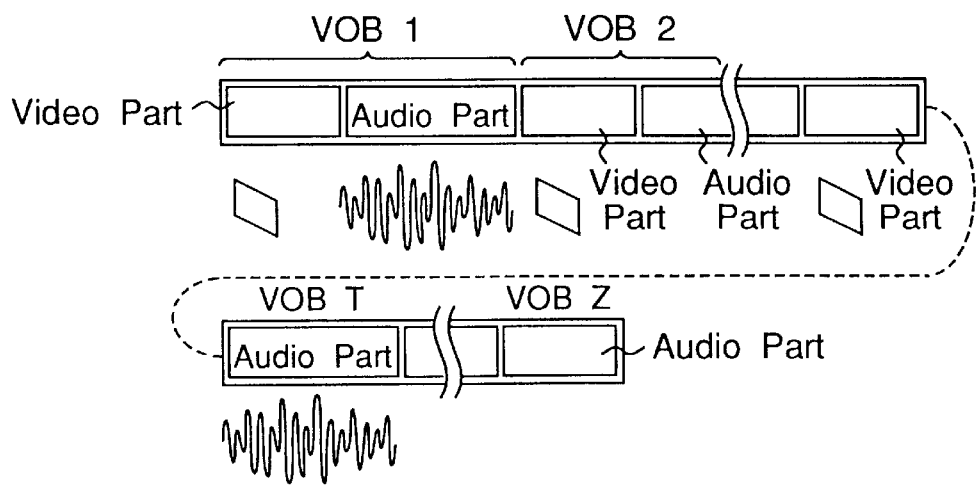

For example, the video data (video stream part) and the audio data (audio stream part) can be incorporated in a single VOB. Such an example is shown in FIG. 10(c). In this case, the video data of the still picture is stored in the video part, which is located in the leading half portion of the VOB, and the audio data is stored in the audio part, which is located in the trailing half portion of the VOB. FIG. 10(c) shows RTR_STO.VRO file, such as shown in FIG. 8(b).

It is noted that the first system stream ST1 shown in FIG. 11 and the video part shown in FIG. 10(c) are generally referred to as a video part stream. Similarly, the second system stream ST2 shown in FIG. 12 and the audio part shown in FIG. 10(c) are generally referred to as an audio part stream.

Figure 8B:
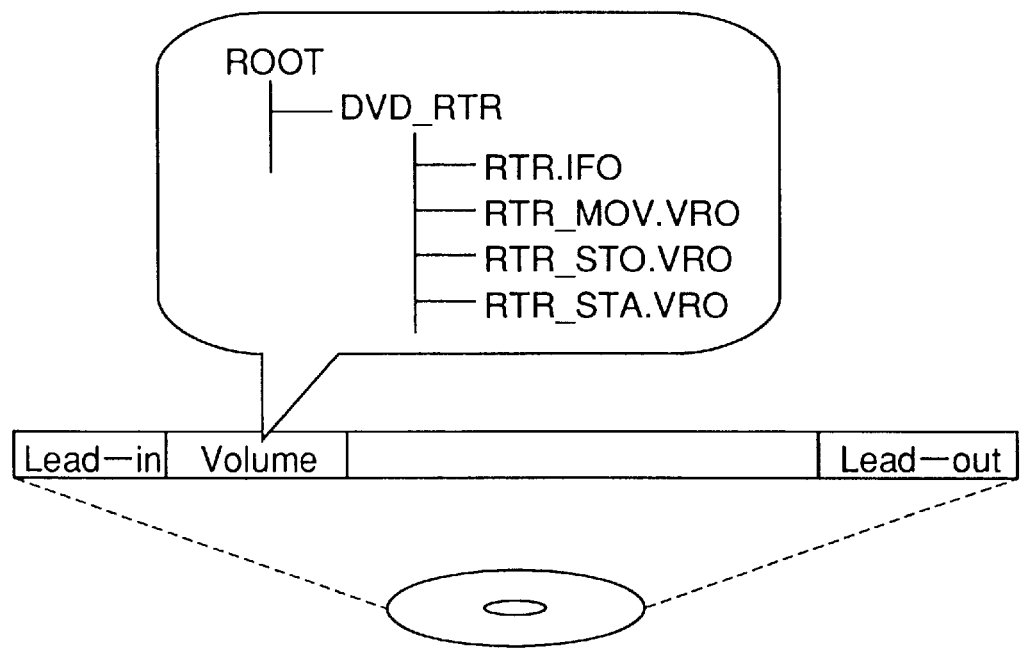

The file structure may also be as shown in FIG. 8(b). In this case, the V1DEO_RT directory corresponds to the DVD_RTR directory, and RTR.IFO, RTR_STO.VRO, RTR_STA.VRO, and RTR_MOV.VRO files are under the DVD_RTR directory.

The RTR.IFO file corresponds to the management information file. The RTR_STO.VRO and RTR_STA.VRO files are related to the still picture data. The RTR_STO.VRO file records the still picture data (video part) and the audio data (audio part) simultaneously recorded with the still picture data. The RTR_STA.VRO file records only the audio data (audio part) edited after initial recording. Audio data in the RTR_STA.VRO file is recorded with a relationship to still picture data recorded in the RTR_STO.VRO file. Moving picture data is recorded separately from still picture data in the RTR_MOV.VRO file.

Still Picture Data VOB and Audio Data VOB

As described above with reference to FIG. 11, the time stamps for the still picture data VOBs and audio data VOBs are as shown below.

SCR1=0

SCR2≦27000000 (27 MHz)−Tp

SCR3=27000000 (27 MHz)

Tp=55296 (27 MHz)

PTS1=PTS3=90000+Tv

DTS1=90000

Description of a DVD Recording Apparatus

A DVD recording apparatus is described next.

Figure 1:
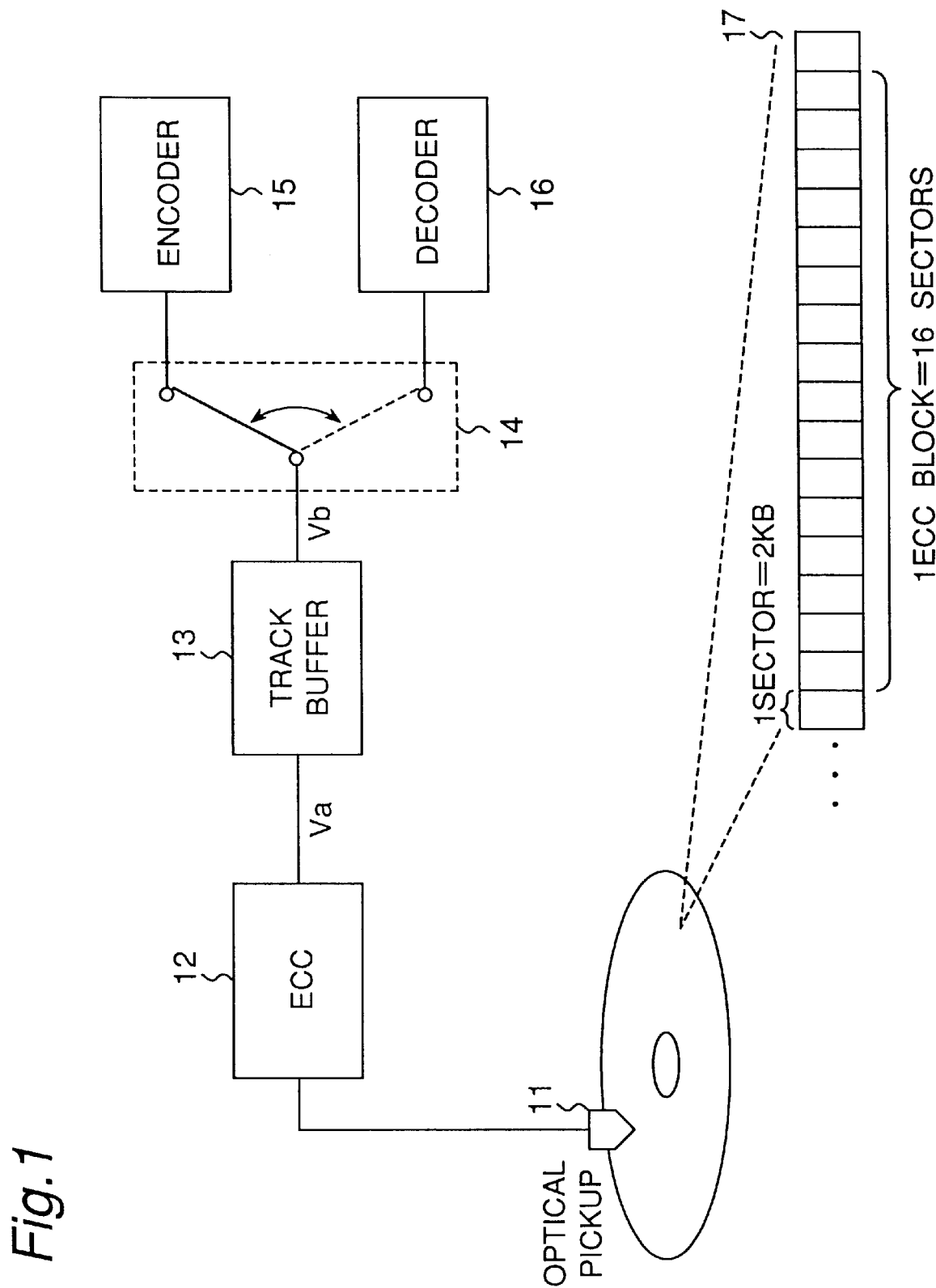
FIG. 1 is a block diagram of a DVD recording apparatus drive.

FIG. 1 is a block diagram of a DVD recording apparatus. Shown in FIG. 11 are: an optical pickup 11 for reading data from and writing data to a disc; an error correction code (ECC) processor 12; a track buffer 13; a switch 14 for changing input to and output from the track buffer 13; an encoder 15; and a decoder 16. Reference numeral 17 is an enlarged view of the disc surface.

As shown in enlarged view 17, the smallest recording unit for data recorded to a DVD-RAM disc is the sector, which holds 2 KB. One ECC block contains 16 sectors, and is the unit processed by the ECC processor 12 for error correction.

Using a track buffer 13 enables AV data recorded at non-contiguous locations on the disc to be supplied to the decoder without an interruption in the data stream. This is described below with reference to FIG. 2.

FIG. 2(a) shows the address space on the disc. When the AV data is recorded to two separate contiguous regions, [a1, a2] and [a3, a4] as shown in FIG. 2(a), continuous presentation of the AV data can be maintained while seeking address a3 from a2 by supplying data accumulated to the track buffer to the decoder. This is illustrated in FIG. 2(b).

When reading AV data from address a1 starts at time t1, the data is input to the track buffer with output from the track buffer beginning at the same time. There is, however, a difference of (Va−Vb) between the track buffer input rate Va and the output rate Vb from the track buffer. This means that data gradually accumulates in the track buffer at the rate (Va−Vb). This continues to address a2 at time t2. If B(t2) is the amount of data accumulated in the track buffer at time t2, the data B(t2) stored in the track buffer can be supplied to the decoder until reading begins again from address a3 at time t3.

More specifically, if the amount of data read from [a1, a2] before the seek operation begins is at least equal to a predetermined amount, i.e., at least equal to the amount of data supplied to the decoder during the seek operation, AV data can be supplied without interruption to the decoder.

It should be noted that the still picture data system stream ST1 and audio data system stream ST2 processed contiguously by the decoder in the present invention is not necessarily contiguously recorded to the disc. In the case shown in FIG. 20, for example, there are two audio data system streams, streams #2 and #3, that can be processed continuously with the still picture data system stream ST1 #1 by the decoder. It will be obvious that only one of these audio data system streams can be recorded contiguously to the still picture data system stream ST1 on disc, and the other audio data system stream ST2 must be recorded at an address that is non-contiguous to stream #1.

A DVD recording apparatus comprised as described above, however, can still supply two non-contiguous streams to the decoder with no interruption between the streams. The decoder can therefore continuously process two streams, and the operation described with reference to FIG. 19 can be assured.

It should be further noted that while the above example has addressed reading, that is, reproducing data from DVD-RAM, the same principle applies to writing, that is, recording data to DVD-RAM.

More specifically, insofar as a predetermined amount of data is recorded contiguously to DVD-RAM, continuous reproduction and recording are possible even if the AV data is recorded non-contiguously.

Figure 12:
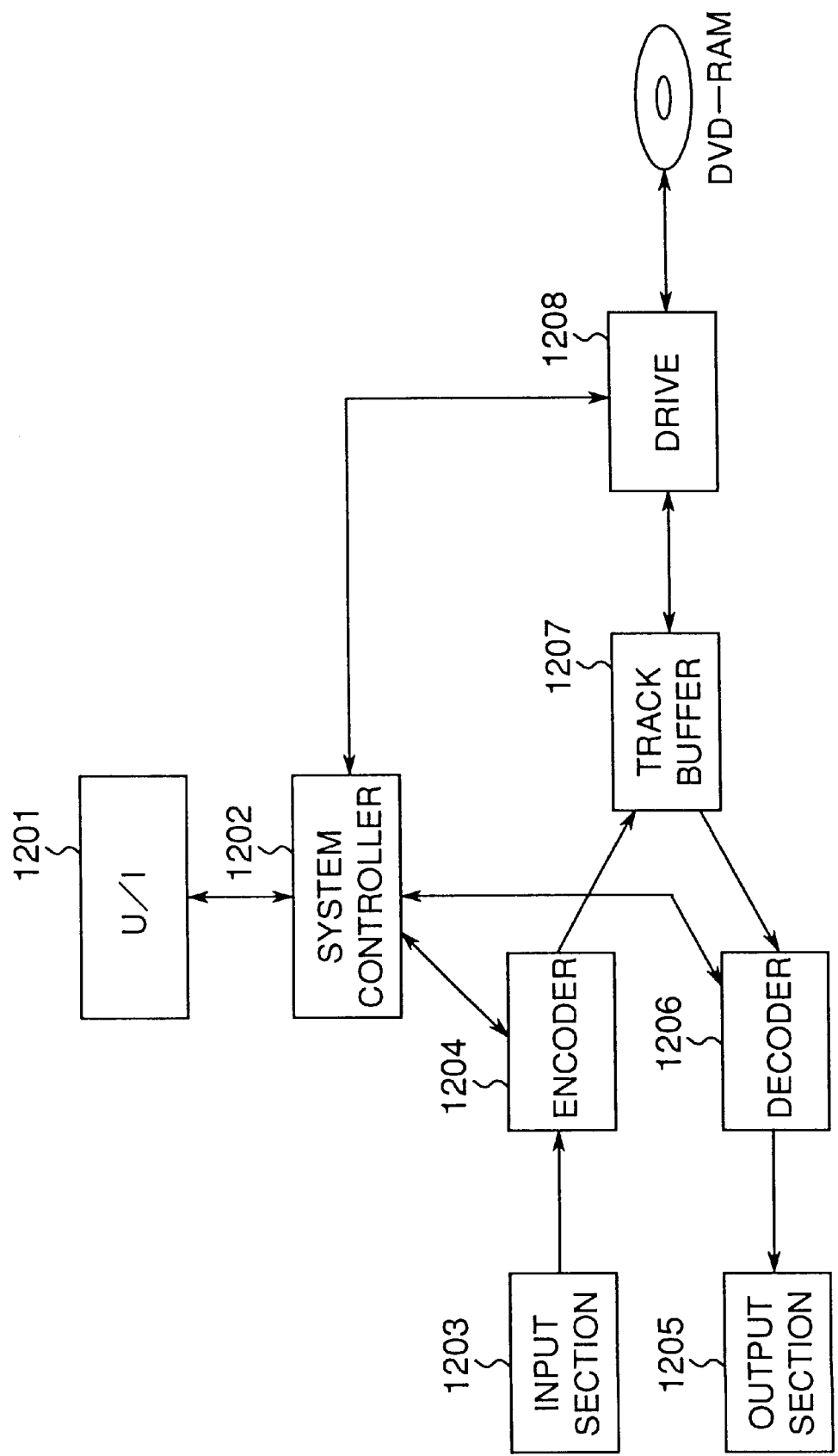
FIG. 12 is a block diagram of a DVD recording apparatus.

FIG. 12 is a block diagram of a DVD recording apparatus.

Shown in FIG. 12 are: a user interface 1201 for presenting messages to the user and receiving commands from the user; a system controller 1202 for overall system control and management; an input section 1203, typically a camera and microphone; an encoder 1204, including a video encoder, audio encoder, and system stream encoder; an output section 1205, typically comprising a monitor and speaker; a decoder 1206, including a system stream decoder, audio decoder, and video decoder; a track buffer 1207; and a drive 1208.

Figure 13:
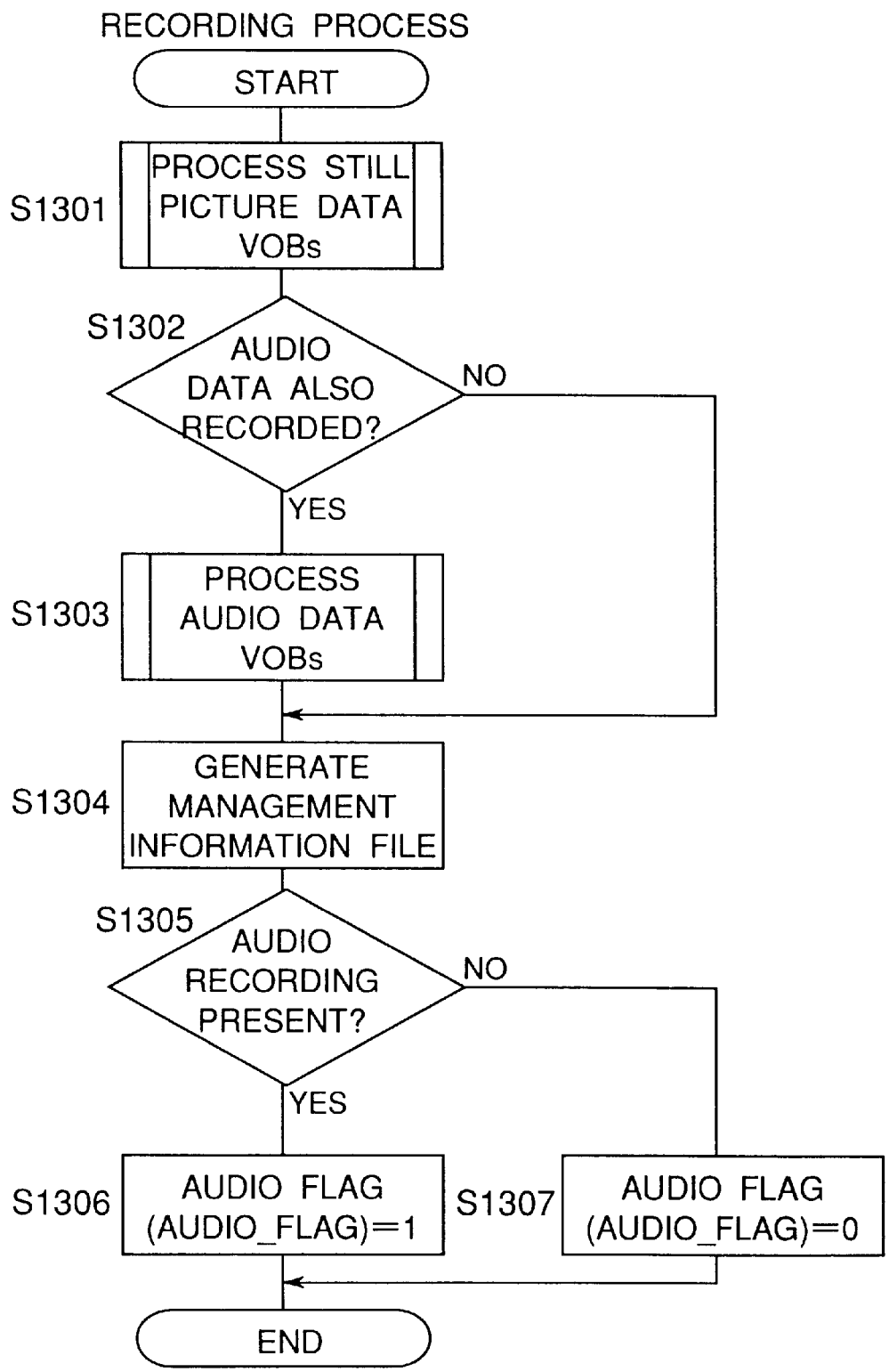
FIG. 13 is a flow chart of a recording process of the DVD recording apparatus shown in FIG. 12.
Figure 14:
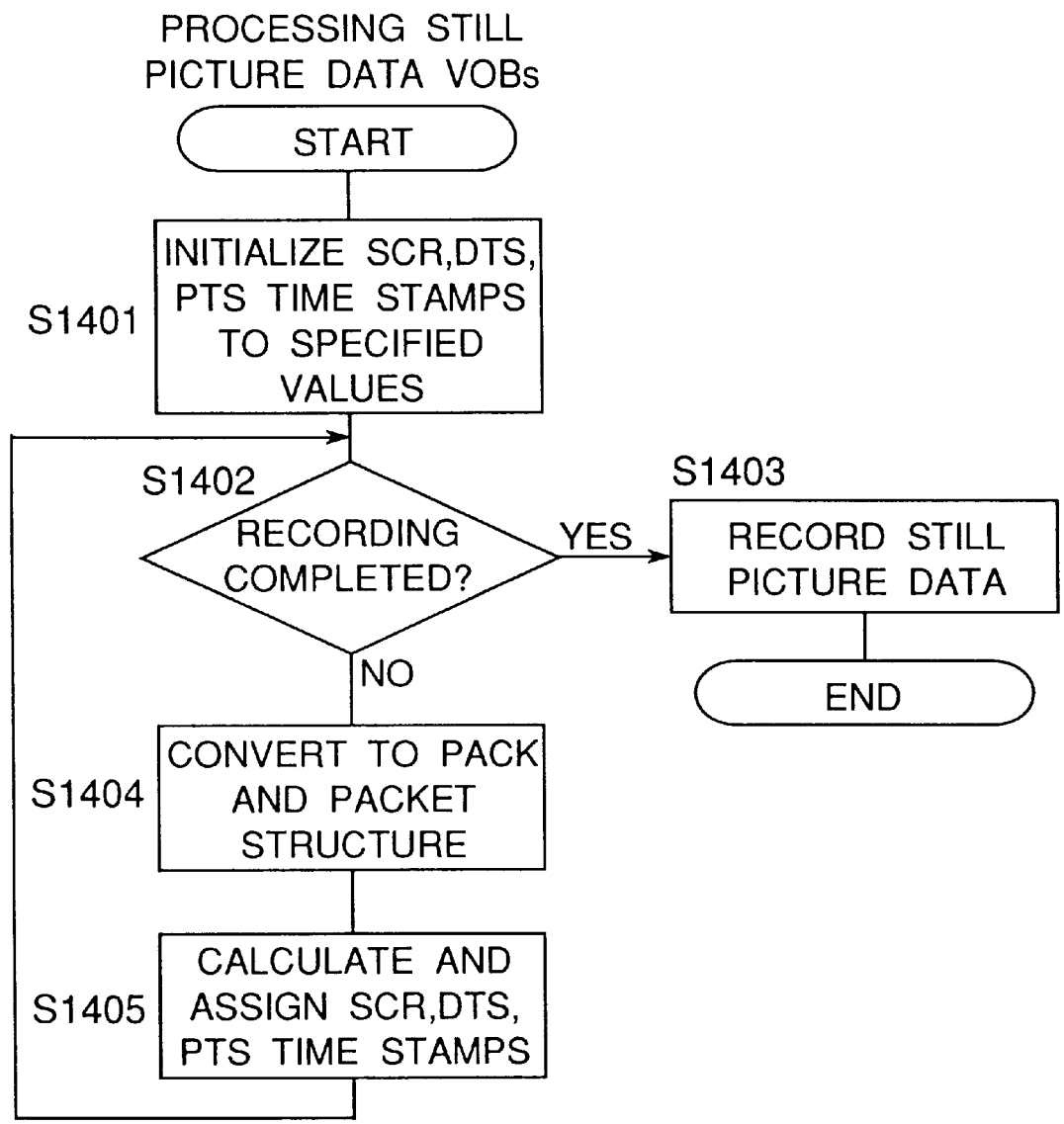
FIG. 14 is a flow chart of the still picture data VOB generating process shown as step S1301 in FIG. 13 in the DVD recording apparatus shown in FIG. 12.
Figure 15:
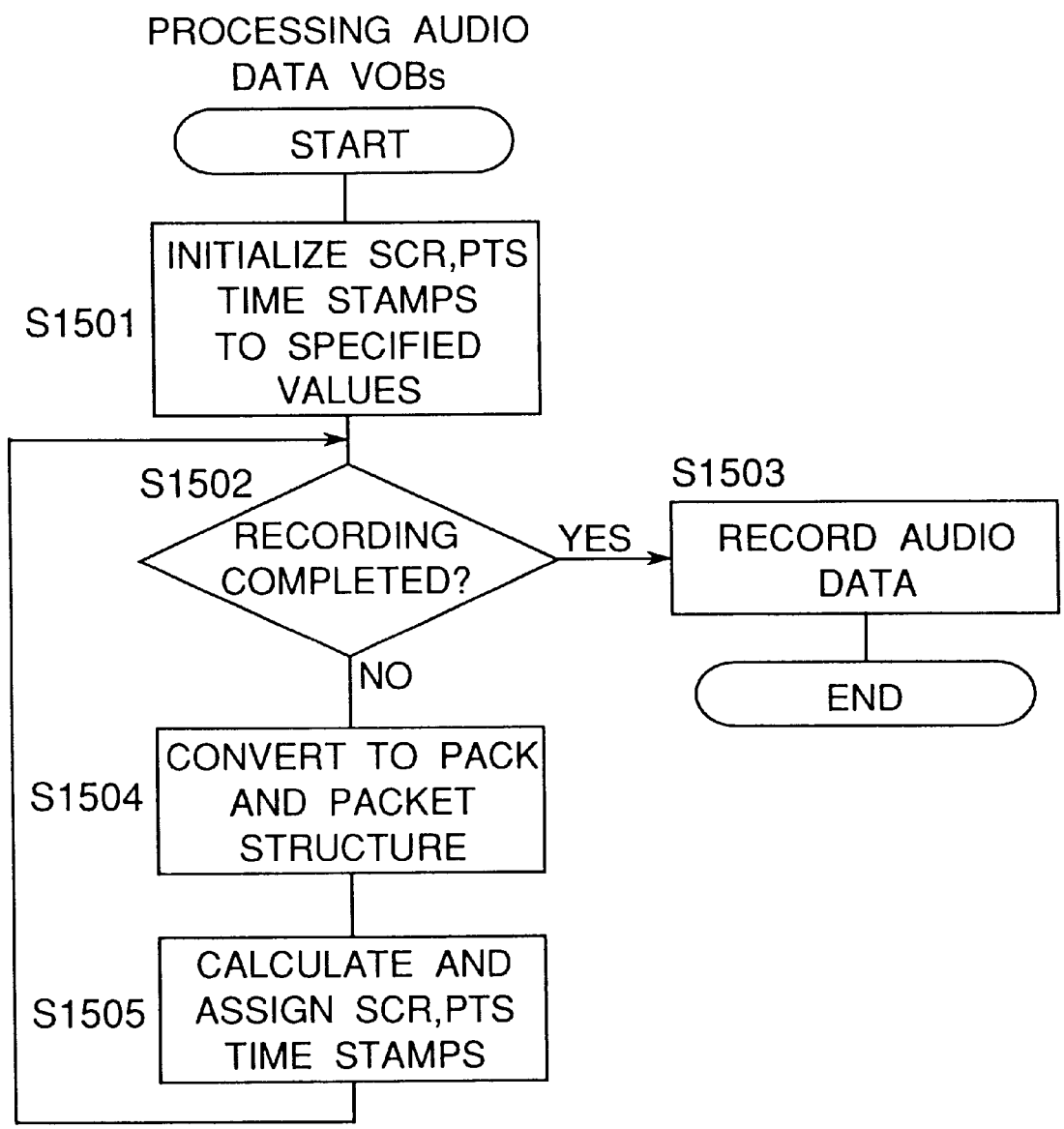
FIG. 15 is a flow chart of the audio data VOB generating process shown as step S1303 in FIG. 13 in the DVD recording apparatus shown in FIG. 12.

The recording operation of a DVD recording apparatus thus comprised is described next below with reference to the flow charts in FIG. 13, FIG. 14, and FIG. 15.

Operation starts when a user command is received by the user interface 1201. The user interface 1201 passes the user command to the system controller 1202. The system controller 1202 interprets the user command, and appropriately instructs the various modules to perform the required processes. Assuming that the user request is to capture a still picture and record the accompanying audio, the system controller 1202 instructs the encoder 1204 to encode one video frame and encode the audio.

The encoder 1204 thus video encodes and then system encodes the one video frame sent from the input section 1203, thus generating a still picture data VOB. The encoder 1204 then sends this still picture data VOB to the track buffer 1207. (S1301)

This still picture data VOB encoding process is described more specifically below with reference to FIG. 14.

The encoder 1204 first initializes the various time stamps. In this example, it resets the system clock reference SCR to 0, and initializes the PTS and DTS to 93003 (90 kHz) and 90000 (90 kHz), respectively. (S1401) Note that if PAL video is used, the PTS is initialized to 93600 (90 kHz).

If still picture data recording is not completed, the encoder 1204 converts the still picture data to a pack and packet structure. (S1404)

Once the pack and packet structure is generated, the encoder 1204 calculates the SCR, DTS, and PTS time stamps, and inserts these values to the pack and packet stream of still picture data. (S1405) Note that the SCR of the first pack is set to the initialization value of 0, and the PTS and DTS are set to the initialization values of 93003 (90 kHz) and 90000 (90 kHz), respectively. The SCR of the last pack in the stream is forced to a time stamp earlier than 27000000 (27 MHz) minus the pack transfer time Tp.

The encoder 1204 then loops back to S1402, and determines whether still picture data recording has finished. If it has, the encoder 1204 notifies the system controller 1202 that still picture data VOB generation has been completed. The system controller 1202 then controls the drive 1208 to record the still picture data VOBs stored to the track buffer 1207 to the DVD-RAM disc. (S1403)

It will also be obvious to one with ordinary skill in the related art that while a DVD recording apparatus according to this preferred embodiment of the invention records to DVD-RAM disc after all still picture data VOBs have been generated, recording can proceed parallel to still picture data VOB generation to record the VOBs as they are generated.

Returning to FIG. 13, after still picture data encoding is completed, the encoder 1204 determines whether there is an audio recording to encode. If there is, it begins encoding the audio data sent from the input section 1203, and sequentially transfers the generated audio data VOBs to the track buffer 1207. (S1302, S1303)

This audio data encoding process is described more specifically below with reference to FIG. 15.

The encoder 1204 first initializes the SCR and PTS time stamps. In this example, it sets the system clock reference SCR to 27000000 (27 MHz), and initializes the PTS to 93003 (90 kHz). Note that if the simultaneously presented still picture is PAL video, the PTS is initialized to 93600 (90 kHz). (S1501)

If audio data recording is not completed, the encoder 1204 converts the audio data to a pack and packet structure (S1504), and calculates and insets the SCR and PTS time stamps (S1505). In this example, the SCR of the first pack is set to the initialization value of 27000000 (27 MHz), and the PTS is set to 93003 (90 kHz).

The encoder 1204 then loops back to S1502, and determines whether audio data recording has finished. If it has, the encoder 1204 notifies the system controller 1202. The system controller 1202 then controls the drive 1208 to record the audio data VOBs stored in the track buffer 1207 to the DVD-RAM disc. (S1503)

It will also be obvious to one with ordinary skill in the related art that while a DVD recording apparatus according to this preferred embodiment of the invention records to DVD-RAM disc after all audio data VOBs have been generated, recording can proceed parallel to audio data VOB generation to record the VOBs as they are generated.

The DVD recording apparatus continues recording still picture data and audio data to the DVD-RAM disc using the above-described recording method until the user stops stream recording.

A stop recording command from the user is applied to the system controller 1202 from the user interface 1201. The system controller 1202 thus sends a stop recording command to the encoder 1204, and controls the drive 1208 to record the remaining VOBs in the track buffer 1207 to the DVD-RAM disc.

Figure 9A:
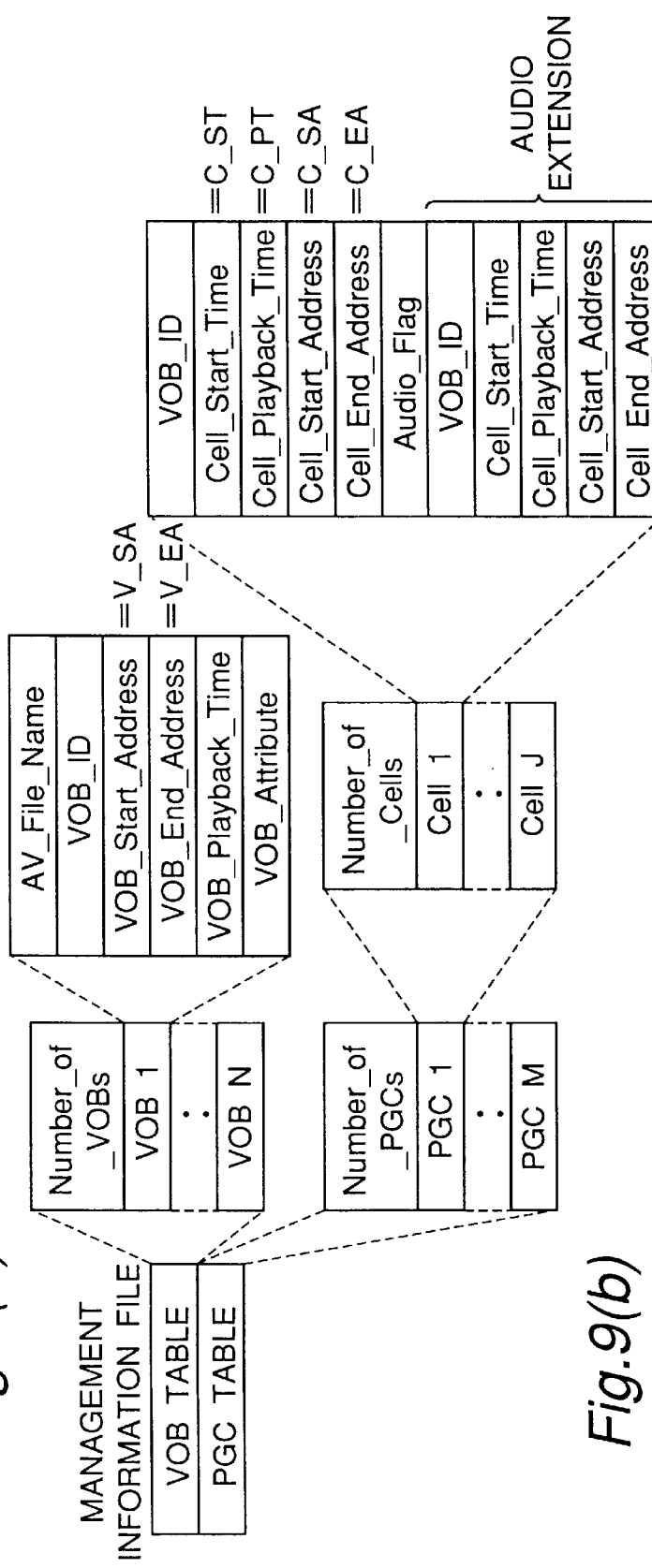
FIGS. 9(a) and 9(b) show the structure of a management information file, and the data stream.
Figure 9B:
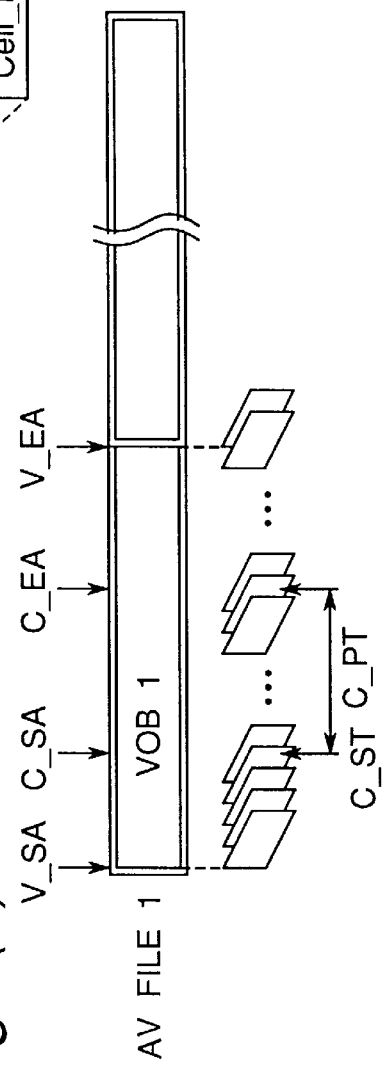

After completing the above-described sequence, the system controller 1202 generates a management information file containing a VOB table and PGC table as shown in FIG. 9(a), and drives the drive 1208 to record the management information file to the DVD-RAM disc. (S1304)

Decision diamond S1305 then determines whether audio data was recorded. If it was, the audio flag (Audio_Flag) is set to 1 in this example (S1306); if there was no audio data, the audio flag (Audio_Flag) is reset to 0 in this example (S1307).

The management information is also set to adjust the cell playback time (Cell_Playback_Time) for the still picture data and audio data to the audio playback time.

The recording method according to the present invention as described above thus records to DVD-RAM disc still picture data and audio data in which the time stamps are assigned to predetermined values.

Figure 16:
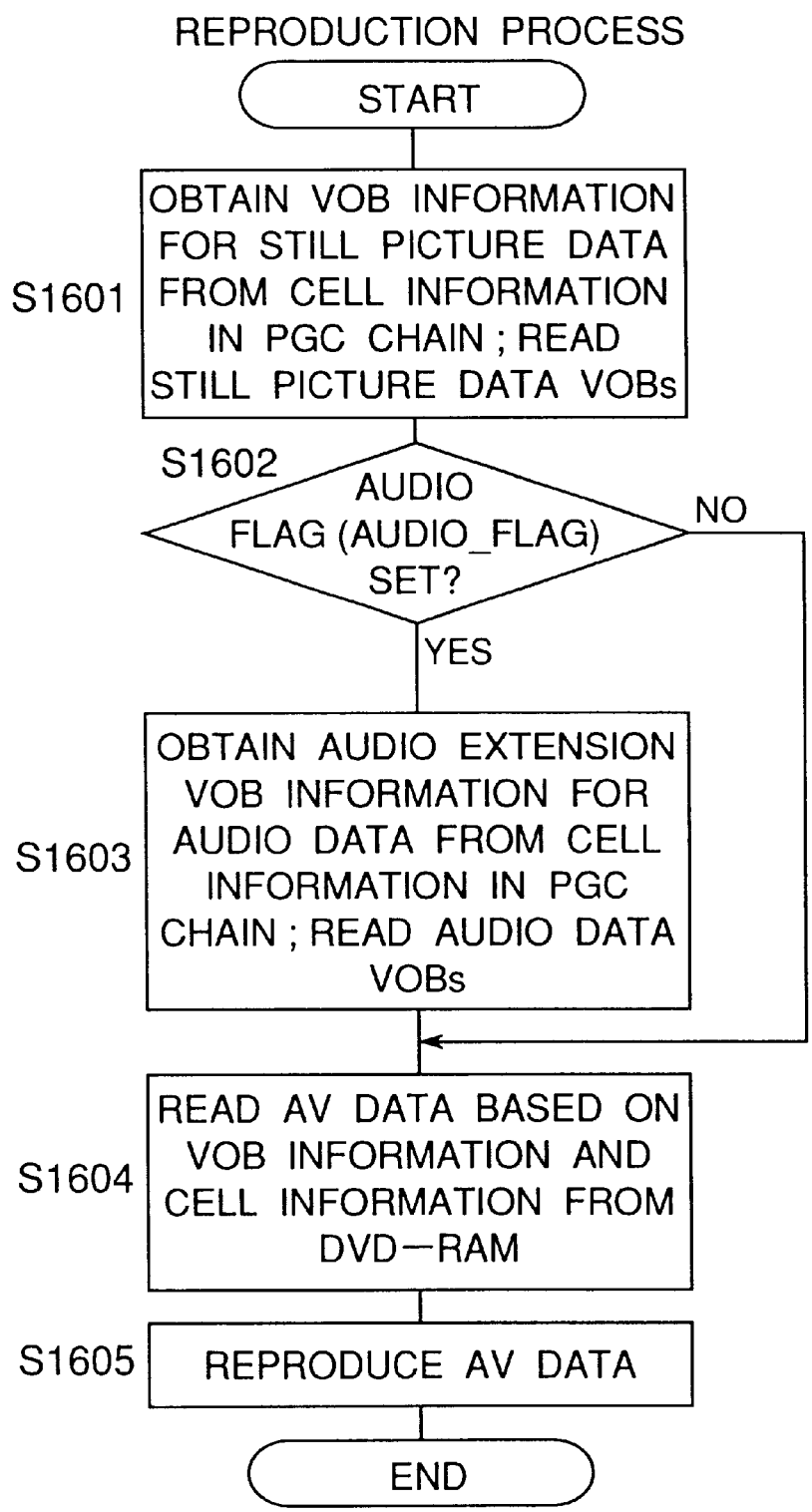
FIG. 16 is a flow chart of the management information file generating process shown as step S1304 in FIG. 13 in the DVD recording apparatus shown in FIG. 12.

The playback (reproducing) apparatus of the DVD recording apparatus is described next below with reference to FIG. 12 and the flow chart in FIG. 16.

Operation starts when a user command is received by the user interface 1201. The user interface 1201 passes the user command to the system controller 1202. The system controller 1202 interprets the user command, and appropriately instructs the various modules to perform the required processes. Assuming that the user request is to play the disc, the system controller 1202 controls the drive 1208 to read the PGC table containing the playback order from the management information file.

The system controller 1202 then determines specific PGC information based on the PGC table read from disc. Following the playback order indicated by the PGC information, the system controller 1202 reproduces the corresponding VOBs. More specifically, the PGC information contains the cell playback order. Each cell contains a VOB_ID and VOB start and end address information. This cell information is what enables accessing the still picture data VOBs. (S1601)

The system controller 1202 then determines the state of the audio flag (Audio_Flag) in the still picture data cell to be reproduced. (S1602)

If the audio flag (Audio_Flag) is set (=1), the system controller 1202 reads the extended audio VOB information, that is, the VOB_ID and VOB start and end addresses, from the still picture data cell information to read both the still picture data VOB and the audio data VOB to be simultaneously reproduced. (S1603)

As described above, the cell address information is referenced to the VOB, and VOB address information is referenced to the AV file. In practice, therefore, the VOB address information is added to the cell address information to calculate the address in the AV file that is used by the DVD reproducing apparatus to access and read AV data recorded to the DVD-RAM disc. (S1604)

It should be noted that if the audio flag (Audio_Flag) is not set (i.e., is reset to 0), that is, only still picture data is to be reproduced with no audio, the still picture data is presented for the time indicated by the Cell_Playback_Time stored in the management information file.

The decoder process for continuously processing still picture data VOBs and audio data VOBs when the audio flag (Audio_Flag) is set (=1) is described more specifically below.

That is, the system controller 1202 first reads a still picture data VOB into the track buffer 1207, and if the audio flag (Audio_Flag) is set, instructs the decoder 1206 to decode the still picture data VOBs during the time needed to read the audio data VOB into the track buffer 1207. The decoder 1206 is instructed to begin decoding as soon as audio data VOB reading starts. The decoder 1206 thus reads MPEG streams stored to the track buffer 1207, and passes the decoded data to the output section 1205. The output section 1205 outputs data received from the decoder 1206 to the monitor and speaker at the presentation time specified in the data.

By thus first reading and decoding still picture data as described above, image data and audio data can be reproduced synchronized to a specified presentation time once audio data reading begins.

It is important to note here that the decoder 1206 is able to process a single still picture and accompanying audio data as a single VOB by constructing still picture data VOBs and audio data VOBs as described above.

It should also be noted that while the present invention has been described above with reference to a DVD-RAM disc, it can also be used with other types of media. The present invention shall therefore not be limited to DVD-RAM discs and other types of optical discs.

Furthermore, the present invention has been described using by way of example an audio stream as the stream to be simultaneously reproduced with the still picture data system stream ST1. The invention shall not be so limited, however, and other types of information that can be output with a still picture data system stream ST1 can be alternatively used. For example, a secondary image system stream comprising bitmapped data or text data can also be used. A typical application for such a second image system stream is to provide captions or subtitles displayed superimposed on the photographed still picture.

Yet further, the present invention has been described using the cell as the unit for linking still picture data and audio data. Alternatively, one cell could be equal to one VOB, and the still picture data and audio data could be linked in VOB units.

Yet further, the present invention has been described using same the cell playback time (Cell_Playback_Time) information in the still picture data and audio data. The cell playback time, however, need not necessarily be the same. For example, the audio data information could be given priority such that when the reproducing apparatus reads a different cell playback time (Cell_Playback_Time) it ignores the playback information for the still picture data.

Yet further, the present invention has been described with the still picture data VOBs and audio data VOBs recorded to an AV file separately from other VOBs. The present invention does not impose any limits on the AV file structure, however, and still picture data VOBs and audio data VOBs can be recorded with other VOBs in the same AV file.

Advantages of the Invention

In an optical disc to which at least still picture data and audio data are recorded to separate recording areas as MPEG streams having a pack and packet structure, the time at which input of the last pack of still picture data to the decoder buffer starts (system clock reference SCR2), and the time at which input of the first pack of audio data to the decoder buffer starts (system clock reference SCR3), are recorded by means of the present invention to satisfy the equation $$SCR2+Tp \leq SCR3$$

where Tp is the time required to transfer one pack to the decoder buffer.

This makes it possible to decode separately recorded still picture data and audio data system streams as though they are a single MPEG stream.

In addition, by recording the time at which input of the first pack of still picture data to the decoder buffer starts (SCR1), the time at which input of the last pack of still picture data to the decoder buffer starts (SCR2), and the time at which input of the first pack of audio data to the decoder buffer starts (SCR3), to the following values:

$$SCR1=0$$
$$SCR2+Tp \leq 27000000 \text{ (27 MHz)}$$
$$SCR3=27000000 \text{ (27 MHz)}$$

still picture data and audio data encoded by different encoders can still be decoded as though they are a single MPEG stream.

Furthermore, by recording the [still picture] data presentation start time (PTS1) and audio data presentation start time (PTS3) as the same values, still picture data can be presented synchronized to the audio data, that is, presentation can begin simultaneously.

In addition, by defining the still picture data presentation start time (PTS1) and audio data presentation start time (PTS3) as follows:

$$PTS1=PTS3=90000 \text{ (90 kHz)}+Tv$$

the decoder can synchronously reproduce even still picture data and audio data encoded by different encoders.

Yet further, by setting an identification flag (Audio_Flag) for declaring the presence of audio data to be synchronously reproduced in the management information of still picture data, an optical disc reproducing apparatus can determine whether there is audio data to be reproduced, and still picture data and audio data can thus be synchronously reproduced.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An optical disc that is reproducible by a reproducing apparatus having a decoder buffer, decoder, and output section, said optical disc having recorded thereto
   a video part stream comprising a plurality of units containing still picture data for at least one picture, and
   an audio part stream comprising one or a plurality of units containing audio data to be reproduced with the still picture data;
   wherein said units store time stamp information indicative of a time required for a decoding process and output, said time stamp information includes a time SCR2 indicative of a time at which the last unit in the video part stream is input to a decoder buffer, and
   a time SCR3 indicative of a time at which the first unit in the audio part stream is input to a decoder buffer, and
   said times SCR2 and SCR3 are defined to satisfy the following equation:

$$SCR2+Tp \leq SCR3$$

where Tp is the time required from the start to the end of inputting one unit to a decoder buffer.

2. The optical disc as set forth in claim 1, wherein the time stamp information further includes a time SCR1 indicative of a time at which the first unit in the video part stream is input to a decoder buffer, and times SCR1 and SCR2 are defined as follow:

$$SCR1=0$$
$$SCR2+Tp \leq 27000000 \text{ (27 MHz)}$$

where (27 MHz) indicates that the numeric value shown therebefore is a count of a 27 MHz clock.

3. The optical disc as set forth in claim 1, wherein time SCR3 is defined as:

$$SCR3=27000000 \text{ (27 MHz)}.$$

4. The optical disc as set forth in claim 1, wherein the time stamp information further includes:
   time PTS1 indicative of a time at which the video part stream is output from the output section;
   time PTS3 indicative of a time at which the audio part stream is output from the decoder; and
   times PTS1 and PTS3 are the same.

5. The optical disc as set forth in claim 1, wherein the time stamp information further includes:
   decoding start time DTS1 indicative of a time at which a decoder starts decoding the video part stream; and
   time DTS1 is defined as:

$$DTS1=90000 \text{ (90 kHz)}$$

where (90 kHz) indicates that the numeric value shown therebefore is a count of a 90 kHz clock.

6. The optical disc as set forth in claim 4, wherein times PTS1 and PTS3 are defined by the following equation:

$$PTS1=PTS3=90000 \text{ (90 kHz)}+Tv$$

where (90 kHz) indicates that the numeric value shown therebefore is a count of a 90 kHz clock, and Tv is the video data frame period.

7. The optical disc as set forth in claim 1, wherein video and audio part stream management information is further recorded to the optical disc, and
   management information for the video part stream includes an identification flag for declaring there is audio data to be reproduced synchronized with the still picture data.

8. An optical disc recording apparatus for recording a system stream containing still picture data and audio data to be reproduced with the still picture data to an optical disc that is reproducible by a reproducing apparatus having a decoder buffer, decoder, and output section, said optical disc recording apparatus comprising:
   an encoder, and
   a system controller;
   said encoder generating a video part stream comprising a plurality of units containing still picture data for at least one picture, and an audio part stream comprising one or a plurality of units containing audio data to be reproduced with the still picture data;

said encoder storing in said units time stamp information indicative of a time required for a decoding process and output;

wherein the time stamp information includes a time SCR2 indicative of a time at which the last unit in the video part stream is input to a decoder buffer, and a time SCR3 indicative of a time at which the first unit in the audio part stream is input to a decoder buffer, and said times SCR2 and SCR3 are defined to satisfy the following equation:

$$SCR2+Tp \leq SCR3$$

where Tp is the time required from the start to the end of inputting one unit to a decoder buffer.

9. The optical disc recording apparatus as set forth in claim 8, wherein the encoder further stores as time stamp information:

a time SCR1 indicative of a time at which the first unit in the video part stream is input to a decoder buffer, and a time PTS1 indicative of a time at which the video part stream is output from the output section, wherein times SCR1, SCR2, and PTS1 are defined as follow:
SCR1=0
SCR2≦27000000 (27 MHz)−Tp
PTS1=90000 (90 kHz)+Tv where (27 MHz) indicates that the numeric value shown therebefore is a count of a 27 MHz clock, (90 kHz) indicates that the numeric value shown therebefore is a count of a 90 kHz clock, Tp is the time required to transfer the last unit of the video part stream, and Tv is the video data frame period.

10. The optical disc recording apparatus as set forth in claim 9, wherein the encoder further stores as time stamp information:

a time PTS3 indicative of a time at which the audio part stream is output from the decoder; and times SCR3 and PTS3 are defined as follow:
SCR3=27000000 (27 MHz)
PTS3=90000 (90 kHz)+Tv.

11. The optical disc recording apparatus as set forth in claim 8, wherein the system controller generates video and audio part stream management information, and stores in the management information for the video part stream an identification flag for declaring there is audio data to be reproduced synchronized with the still picture data.

12. The optical disc recording apparatus as set forth in claim 8, wherein the system controller records audio data reproduction time in the management information for the audio part stream.

13. An optical disc reproducing apparatus for reproducing an optical disc as set forth in claim 7, said optical disc reproducing apparatus comprising:

a decoder buffer;
a decoder;
an output section; and
a system controller;
wherein when the system controller detects that the identification flag is set, the system controller synchronously reproduces still picture data in the video part stream and audio data in the audio part stream.

14. The optical disc reproducing apparatus as set forth in claim 13, wherein when the system controller detects that the identification flag is set, a decoder completely decodes one picture of still picture data recorded to the video part stream and sends the decoded data to the output section;

a decoder then decodes while reproducing audio data stored to the audio part stream; and presentation of still picture data from output section begins with a start of audio presentation.

15. An optical disc recording method for recording a system stream containing still picture data and audio data to be reproduced with the still picture data to an optical disc that is reproducible by a reproducing apparatus having a decoder buffer, decoder, and output section, said optical disc recording method comprising:

a video part stream recording step for recording a video part stream comprising a plurality of units containing still picture data for at least one picture;

an audio part stream recording step for recording an audio part stream comprising one or a plurality of units containing audio data to be reproduced with the still picture data; and a time stamp information recording step for recording time stamp information indicative of a time required for a decoding process and output to said units;

wherein the time stamp information includes a time SCR2 indicative of a time at which the last unit in the video part stream is input to a decoder buffer, and a time SCR3 indicative of a time at which the first unit in the audio part stream is input to a decoder buffer, and said times SCR2 and SCR3 are defined to satisfy the following equation:

$$SCR2+Tp \leq SCR3$$

where Tp is the time required from the start to the end of inputting one unit to a decoder buffer.

16. The optical disc recording method as set forth in claim 15, wherein the time stamp information further includes:

a time SCR1 indicative of a time at which the first unit in the video part stream is input to a decoder buffer, and a time PTS1 indicative of a time at which the video part stream is output from the output section, wherein times SCR1, SCR2, and PTS1 are defined as follow:
SCR1=0
SCR2≦27000000 (27 MHz)−Tp
PTS1=90000 (90 kHz)+Tv where (27 MHz) indicates that the numeric value shown therebefore is a count of a 27 MHz clock, (90 kHz) indicates that the numeric value shown therebefore is a count of a 90 kHz clock, Tp is the time required to transfer the last unit of the video part stream, and Tv is the video data frame period.

17. The optical disc recording method as set forth in claim 16, wherein the time stamp information further includes:

a time PTS3 indicative of a time at which the audio part stream is output from the decoder; and times SCR3 and PTS3 are defined as follow:
SCR3=27000000 (27 MHz)
PTS3=90000 (90 kHz)+Tv.

18. The optical disc recording method as set forth in claim 15, further comprising:

a management information recording step for recording management information for the video and audio part streams, and generates in the management information for the video part stream an identification flag for declaring there is audio data to be reproduced synchronized with the still picture data.

19. The optical disc recording method as set forth in claim 18, wherein an audio data reproduction time is further stored in the management information for the audio part stream.

20. An optical disc reproduction method for reproducing an MPEG stream recorded to an optical disc as set forth in claim 7, said optical disc reproduction method comprising:

a detection step for detecting whether an identification flag for declaring there is audio data to be reproduced synchronized with the still picture data is set in the management information of still picture data for a single picture; and a playback step for synchronously reproducing still picture data and audio data according to the detected state of the identification flag.

21. The optical disc reproduction method as set forth in claim 20, wherein the playback step for synchronously reproducing still picture data and audio data comprises:

a decoding step for completing decoding still picture data for one picture according to the detected state of the identification flag;

a reproducing step for then decoding and reproducing the audio data;

wherein reproducing decoded still picture data starts simultaneously to a start of audio presentation.

* * * * *